United States Patent
Berlin et al.

(10) Patent No.: US 10,693,528 B1
(45) Date of Patent: Jun. 23, 2020

(54) ANTENNA ARRAY SHARING IN A MULTI-OPERATOR RADIO NODE IN A COMMUNICATIONS SYSTEM

(71) Applicant: Corning Research & Development Corporation, Corning, NY (US)

(72) Inventors: Igor Berlin, Potomac, MD (US); Yair Zeev Shapira, Shoham (IL)

(73) Assignee: Corning Reaserch & Development Corporation, Charlotte, NC (US)

( * ) Notice: Subject to any disclaimer, the term of this patent is extended or adjusted under 35 U.S.C. 154(b) by 0 days.

(21) Appl. No.: 16/442,223

(22) Filed: Jun. 14, 2019

(51) Int. Cl.
  *H04B 7/024*  (2017.01)
  *H04B 1/00*   (2006.01)
  *H04B 1/7115* (2018.01)
  *H04B 1/30*   (2006.01)

(52) U.S. Cl.
  CPC .......... *H04B 7/024* (2013.01); *H04B 1/0039* (2013.01); *H04B 1/30* (2013.01); *H04B 1/7115* (2013.01); *H04B 2001/307* (2013.01)

(58) Field of Classification Search
  CPC ........ H04B 7/024; H04B 1/0039; H04B 1/30; H04B 1/7115; H04B 2001/307; H04L 1/0054; H04L 1/005; H04L 25/067; H04L 1/0066; H03M 13/41
  See application file for complete search history.

(56) References Cited

U.S. PATENT DOCUMENTS 5,870,216 A * 2/1999 Brock ................ H04B 7/18504
                                                  398/49
2003/0090777 A1 * 5/2003 Yap ...................... H01Q 3/2676
                                                  359/333

FOREIGN PATENT DOCUMENTS

EP          1320146 B1    6/2006

* cited by examiner

*Primary Examiner* — Ted M Wang
(74) *Attorney, Agent, or Firm* — C. Keither Montgomery

(57) ABSTRACT

A multi-operator radio node for a communications system that supports sharing a common antenna array while supporting individual spectrum of multiple service providers. The multi-operator radio node includes signal processing circuits for each supported service provider. Each signal processing circuit is configured to receive communications signals for a supported service provider to be distributed through a common antenna array to wireless client devices. Each signal processing circuit includes a modem that processes the received communications signals for spectrum of its service provider to provide signal streams to be distributed to co-located antenna elements in the antenna array. Summation circuits are provided at the front end of each RF chain circuit to combine signal streams of the spectrum of the service providers directed to the same antenna element in the antenna array to form signal beams in individual spectrum layers of the service providers.

29 Claims, 13 Drawing Sheets

ANTENNA ARRAY SHARING IN A MULTI-OPERATOR RADIO NODE IN A COMMUNICATIONS SYSTEM

BACKGROUND

The disclosure relates generally to antenna array sharing in a multi-operator radio node in a communications system, such as a macrocell radio, a small cell radio, remote radio heads (RRHs), etc., as examples. Such massive antenna array sharing allows such a communications system to support multiple operators.

Wireless communications is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio node/base station that transmits communications signals distributed over physical communications medium remote unit forming radio frequency (RF) antenna coverage areas, also referred to as "antenna coverage areas." The remote units each contain or are configured to couple to one or more antennas configured to support the desired frequency(ies) of the radio node to provide the antenna coverage areas. Antenna coverage areas can have a radius in the range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1A is an example of a communications system 100 that includes a radio node 102 configured to support one or more service providers $SP_1$-$SP_N$, 104(1)-104(N) as signal sources (also known as "carriers" or "service operators"—e.g., mobile network operator (MNO)) and wireless client devices 106(1)-106(W). For example, the radio node 102 can be a component of a distributed antenna system (DAS) that is configured to distribute communications signal streams 108(1)-108(S) from the radio node 102 to the wireless client devices 106(1)-106(W) based on a downlink communications signal 110(1)-110(N) received from the service providers 104(1)-104(N). As another example, the radio node 102 may be a base station (eNodeB) that includes modem functionality. The communications signal streams 108(1)-108(N) are radiated through antennas 112 to the wireless client devices 106(1)-106(W) in communication range of the antennas 112. As another example, the radio node 102 in the communications system 100 in FIG. 1A can be a small cell radio access node ("small cell") that is configured to support multiple service providers 104(1)-104(N) by distributing a communications signal stream 108(1)-108(S) for the multiple service providers 104(1)-104(N) based on respective communications signals 110(1)-110(N) received from respective evolved packet cores (EPC) network $CN_1$-$CN_N$ of the service provider 104(1)-104(N) through interface connections. Small cells can support one or more service providers in different channels within a frequency band to avoid interference and reduced signal quality as a result. Secure communications tunnels are formed between the wireless client devices 106(1)-106(W) and the respective service provider 104(1)-104(N). Thus, in this example, the radio node 102 essentially appears as a single node (e.g., Evolved Node B (eNodeB) in 4G or gNodeB in 5G) to the service provider 104(1)-104(N). The issue with this approach (sometimes called MOCN) is that the capacity enabled by the channels of the "site operator," which operates radio node 102, is divided between the service providers 104(1)-104(N). A better approach is where each service provider 104(1)-104(N) can use its own spectrum.

Massive Antenna Arrays (MAA) were introduced to enhance performance, in general, and in most cases in the case of a single service provider 104(1)-104(N). MAAs enhance performance by enabling techniques such as MU-MIMO and beamforming. A MAA includes a plurality of antenna elements that can support a number of users, support aggregated data rate, and increase the effective power with reduced interference. A MAA can be provided for each service provider $SP_1$-$SP_N$ supported in a communications system. The communications system 100 can also be configured to support beamforming with a single MAA shared by multiple supported service providers $SP_1$-$SP_N$. For example, the antenna 112 in the communications system 100 in FIG. 1A can be a MAA 114 as shown in FIG. 1B. A MAA 114 contains a plurality of antenna elements 116(1)-116(E), for example sixty-four (64) antenna elements. Beamforming or spatial de-multiplexing is a signal processing technique used in wireless communications for directional signal transmission and/or reception. This is achieved by combining antenna elements in an antenna array in a way that signals at particular angles experience constructive interference while others experience destructive interference. Beamforming can be used at both the transmitting and receiving ends in order to achieve spatial selectivity. For example, the front end of 5G radio nodes, especially at frequencies above 2.5 GigaHertz (GHz) may include a MAA and supporting RF processing circuit elements.

In the communications system 100 in FIG. 1A, the size and number of antenna elements 116(1)-116(E) in the MAA 114 depends on the frequencies and spatial isolation to be supported by a site operator circuit 118 in the radio node 102. The site operator circuit 118 in FIG. 1A is configured to create multiple simultaneous signal beams ("beams") 120(1)-120(N) for the communications signal streams 108(1)-108(S) that are orthogonal and spatially isolated from each other to serve multiple wireless client devices 106(1)-106(W) simultaneously. For example, the multiple beams 120(1)-120(N) may support multiple-input, multiple-output (MIMO) communications. The radio node 102 and MAA 114 are designed to support a maximum number of simultaneous beams 120(1)-120(N). The number of antenna elements 116(1)-116(E) in the MAA 114 dictates the maximum number of supported beams 120(1)-120(N) and shape of each and every beam. Radio signal processing resources in the radio node 102 can be shared to support the multiple service providers 104(1)-104(N). The capacity supported by the radio node 102 is split between the multiple service providers 104(1)-104(N). Beamforming can also be used to focus the beams 120(1)-120(N) to achieve increased communications range with increased signal quality by the reducing interference that results from spatial isolation with other beams 120(1)-120(N). For example, the communications system 100 in FIG. 1A that supports multiple service providers 104(1)-104(N) and beamforming may be deployed in a building environment 200 as shown in FIG. 2. The capacity of the communications system 100 can be increased and multiplied by the number of simultaneous beams 120(1)-120(N) provided with sufficient isolation. MAAs, especially for the sub 6 GHz frequency range, might capture a significant area. For example, a MAA for 3.5 GHz band may typically include thirty-two (32) to sixty-four (64) antenna elements with or without cross polarization arrangement at typical sizes of 13.4"×6.7" and 26.8"×13.4", respectively.

A drawback of using MAA can be the complexity, size, and cost of the antenna array and related electronic circuitry as well as higher power consumption. For example, as shown in FIG. 3, if a conventional fully digital beamforming arrangement is employed in the radio node 102 of the communications system 100 in FIG. 1A, every antenna element 116(1)-116(E) in the MAA 114 is coupled to a separate RF chain circuit 300(1)-300(E) that includes a dedicated downlink digital-to-analog (D/A) converter 302(1)-302(E), a downlink power RF amplifier circuit 304(1)-304(E), uplink analog-to-digital (A/D) converter 306(1)-306(E), an uplink RF amplifier circuit 308(1)-308(E) (e.g., a low noise amplifier (LNA)), a downlink transmitter circuit 310(1)-310(E), and an uplink receiver circuit 312(1)-312(E). For a sixty-four (64) antenna element MAA 114, this means that sixty-four (64) separate RF chain circuits 300(1)-300(E) must be provided, adding size and cost. Every communication signal provided through the RF chain circuits 300(1)-300(E) is processed individually by the radio node 102, thus adding processing complexity in the radio node 102.

No admission is made that any reference cited herein constitutes prior art. Applicant expressly reserves the right to challenge the accuracy and pertinency of any cited documents.

SUMMARY

Embodiments disclosed herein include a multi-operator radio node for a communications system that supports sharing of a common antenna array while supporting the individual spectrum of each service provider operator ("service provider"). In examples disclosed herein, the multi-operator radio node includes a signal processing circuit for each supported service provider. Each signal processing circuit is configured to be coupled to a network of a respective service provider as a signal source to receive downlink communications signals for the service providers to be distributed through the common antenna array (e.g., a massive antenna array (MAA)) to wireless client devices. Each signal processing circuit includes a modem configured to process the received downlink communications signals for the spectrum of its service provider to form signal streams in the individual spectrum of the service providers to be distributed to co-located antenna elements in the antenna array. The signal streams can be beamforming signal streams or multi-user (MU) multiple-input, multiple-output (MIMO) (MU-MIMO)) signal streams as examples. The downlink signal streams in the individual spectrum of its service provider are radiated by the antenna elements to form downlink signal beams for the individual spectrum of the service provider. The downlink signal streams are coupled to a radio-frequency (RF) chain circuit between the signal processing circuits and the antenna elements in the antenna array to perform RF processing on downlink signal streams, such as digital-to-analog conversion, amplification, and/or frequency conversion. To provide for the multi-operator radio node to support the multiple service providers with the common antenna array, summation circuits are provided at the front end of each RF chain circuit to combine downlink signal streams of the spectrum of the service providers directed to the same antenna element in the antenna array to form downlink signal beams in individual spectrum layers of the service providers. This allows the RF chain circuits and their respective antenna elements of the antenna array to be shared for reduced size, cost, and/or power. Thus, each service provider uses its own spectrum such that the capacity of the multi-operator radio node is not split between the different service providers. The multi-operator radio node allows less radio nodes to be used to service a given area needed to be serviced by the service providers as opposed to providing a radio node for each service provider in the area.

One exemplary embodiment of the disclosure relates to a radio node for distributing communications signals in a communications system. The radio node comprises a first signal processing circuit comprising a first downlink input port configured to receive a first downlink communications signal from a first signal source associated with a first service provider, and a first modem coupled to the first downlink input port, the first modem configured to form a plurality of first downlink signal streams in an individual spectrum of the first service provider and distribute each of the plurality of first downlink signal streams to a respective downlink signal processing output port among a plurality of first downlink signal processing output ports. The radio node also comprises a second signal processing circuit comprising a second downlink input port configured to receive a second downlink communications signal from a second signal source associated with a second service provider having a spectrum different than the spectrum of the first service provider, and a second modem coupled to the second downlink input port, the second modem configured to form a plurality of second downlink signal streams in an individual spectrum of the second service provider and distribute each of the plurality of second downlink signal streams to a respective downlink signal processing output port among a plurality of second downlink signal processing output ports. The radio node also comprises a plurality of downlink combiner circuits each comprising a first downlink combiner input port coupled to a first downlink signal processing output port among the plurality of first downlink signal processing output ports, a second downlink combiner input port coupled to a second downlink signal processing output port among the plurality of second downlink signal processing output ports, and a downlink combiner output port coupled to a respective RF chain circuit among a plurality of RF chain circuits. Each downlink combiner circuit among the plurality of downlink combiner circuits is configured to combine a downlink signal stream among the plurality of first downlink signal streams on the first downlink combiner input port and a downlink signal stream among the plurality of second downlink signal streams on the second downlink combiner input port to generate a combined downlink signal stream on the downlink combiner output port. The plurality of RF chain circuits are each coupled to a downlink combiner output port of a respective downlink combiner circuit among the plurality of downlink combiner circuits and a respective antenna element among a plurality of antenna elements in an antenna array. Each RF chain circuit among the plurality of RF chain circuits is configured to receive a respective combined downlink signal stream on the coupled downlink combiner output port, process the combined downlink signal stream into a combined RF downlink signal stream, and distribute the processed combined downlink signal stream to the coupled antenna element among the plurality of antenna elements in the antenna array.

An additional exemplary embodiment of the disclosure relates to a method of distributing communications signals in a communications system to wireless client devices. The method comprises receiving a first downlink communications signal from a first signal source associated with a first service provider. The method also comprises forming a plurality of first downlink signal streams in an individual spectrum of the first service provider based on the first downlink communications signal. The method also comprises receiving a second downlink communications signal from a second signal source associated with a second service provider having a spectrum different than the spectrum of the first service provider. The method also comprises forming a plurality of second downlink signal streams in an individual spectrum of the second service provider based on the second downlink communications signal. The method also comprises combining a downlink signal stream among the plurality of first downlink signal streams with a downlink signal stream among the plurality of second downlink signal streams to generate a combined downlink signal stream. The method also comprises processing the combined downlink signal stream into a combined RF downlink signal stream. The method also comprises distributing the combined RF downlink signal stream to a coupled antenna element among a plurality of antenna elements in an antenna array.

An additional exemplary embodiment of the disclosure relates to a radio node for distributing communications signals in a communications system. The radio node is configured to receive a first downlink communications signal from a first signal source associated with a first service provider. The radio node is also configured to form a plurality of first downlink signal streams in an individual spectrum of the first service provider based on the first downlink communications signal. The radio node is also configured to receive a second downlink communications signal from a second signal source associated with a second service provider having a spectrum outside of the first service provider. The radio node is also configured to form a plurality of second downlink signal streams in an individual spectrum of the second service provider based on the second downlink communications signal. The radio node is also configured to combine a downlink signal stream among the plurality of first downlink signal streams with a downlink signal stream among the plurality of second downlink signal streams to generate a combined downlink signal stream. The radio node is also configured to process the combined downlink signal stream into a combined RF downlink signal stream. The radio node is also configured to distribute the combined RF downlink signal stream to a coupled antenna element among a plurality of antenna elements in an antenna array.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include a multi-operator radio node for a communications system that supports sharing of a common antenna array while supporting the individual spectrum of each service provider operator ("service provider"). In examples disclosed herein, the multi-operator radio node includes a signal processing circuit for each supported service provider. Each signal processing circuit is configured to be coupled to a network of a respective service provider as a signal source to receive downlink communications signals for the service providers to be distributed through the common antenna array (e.g., a massive antenna array (MAA)) to wireless client devices. Each signal processing circuit includes a modem configured to process the received downlink communications signals for the spectrum of its service provider to form signal streams in the individual spectrum of the service providers to be distributed to co-located antenna elements in the antenna array. The signal streams can be beamforming signal streams or multi-user (MU) multiple-input, multiple-output (MIMO) (MU-MIMO)) signal streams as examples. The downlink signal streams in the individual spectrum of its service provider are radiated by the antenna elements to form downlink signal beams for the individual spectrum of the service provider. The downlink signal streams are coupled to a radio-frequency (RF) chain circuit between the signal processing circuits and the antenna elements in the antenna array to perform RF processing on downlink signal streams, such as digital-to-analog conversion, amplification, and/or frequency conversion. To provide for the multi-operator radio node to support the multiple service providers with the common antenna array, summation circuits are provided at the front end of each RF chain circuit to combine downlink signal streams of the spectrum of the service providers directed to the same antenna element in the antenna array to form downlink signal beams in individual spectrum layers of the service providers. This allows the RF chain circuits and their respective antenna elements of the antenna array to be shared for reduced size, cost, and/or power. Thus, each service provider uses its own spectrum such that the capacity of the multi-operator radio node is not split between the different service providers. The multi-operator radio node allows less radio nodes to be used to service a given area needed to be serviced by the service providers as opposed to providing a radio node for each service provider in the area.

Figure 1A:
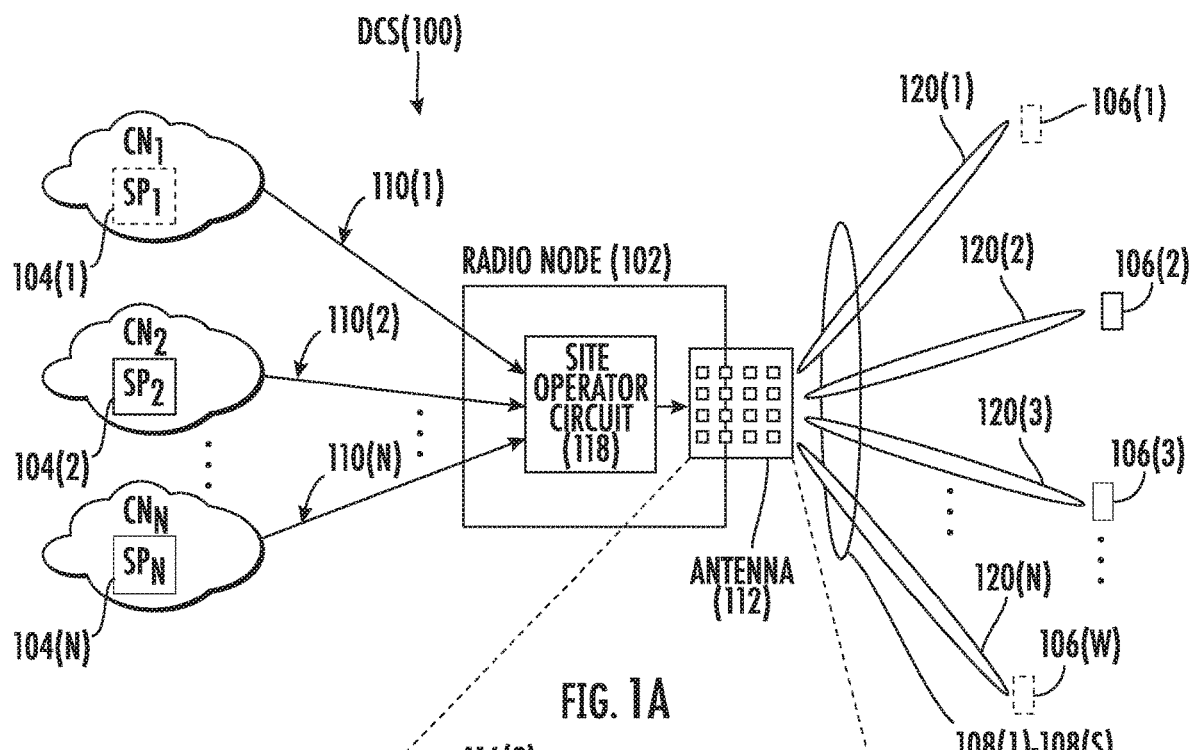
FIG. 1A is a schematic diagram of an exemplary communications system that includes a conventional single operator radio node that includes a massive antenna array (MAA) to support distribution of communications signals for multiple service providers.
Figure 1B:
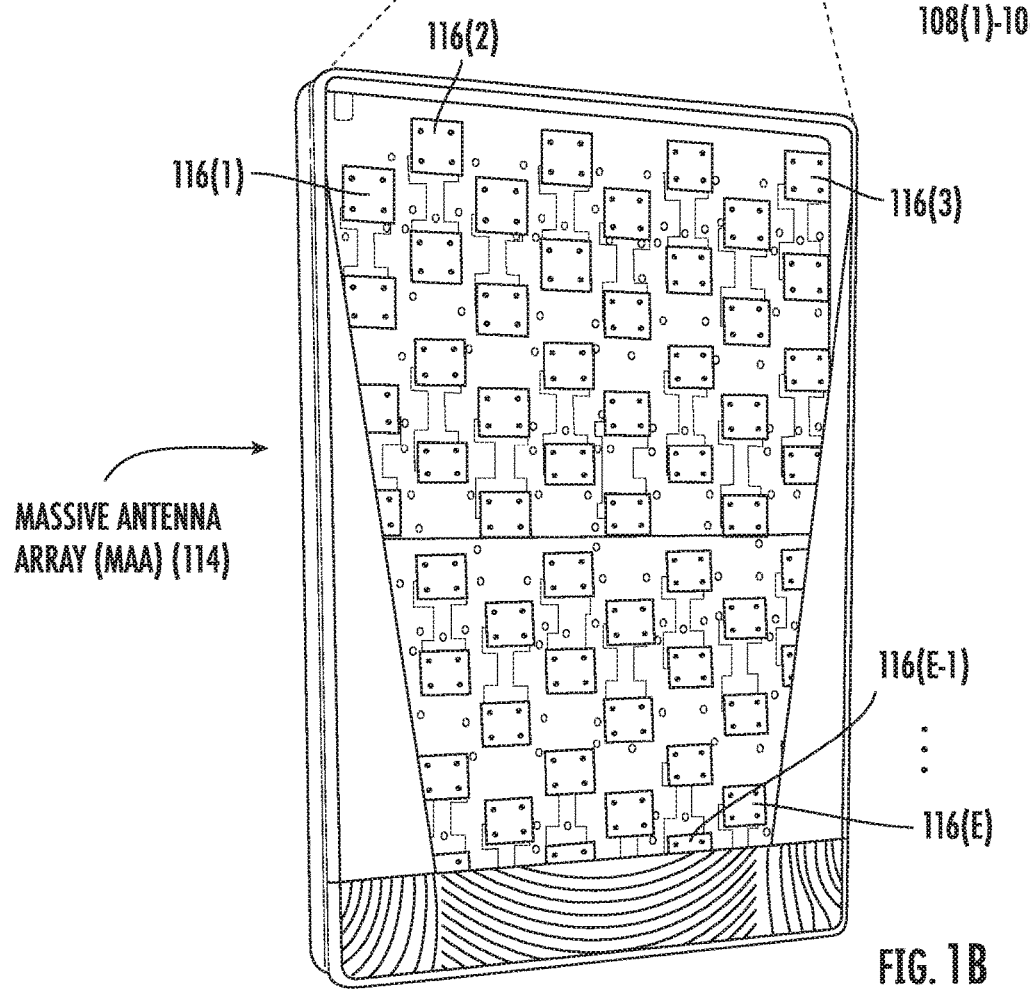
FIG. 1B is an example of the MAA for the single operator radio node in FIG. 1A.
Figure 2:
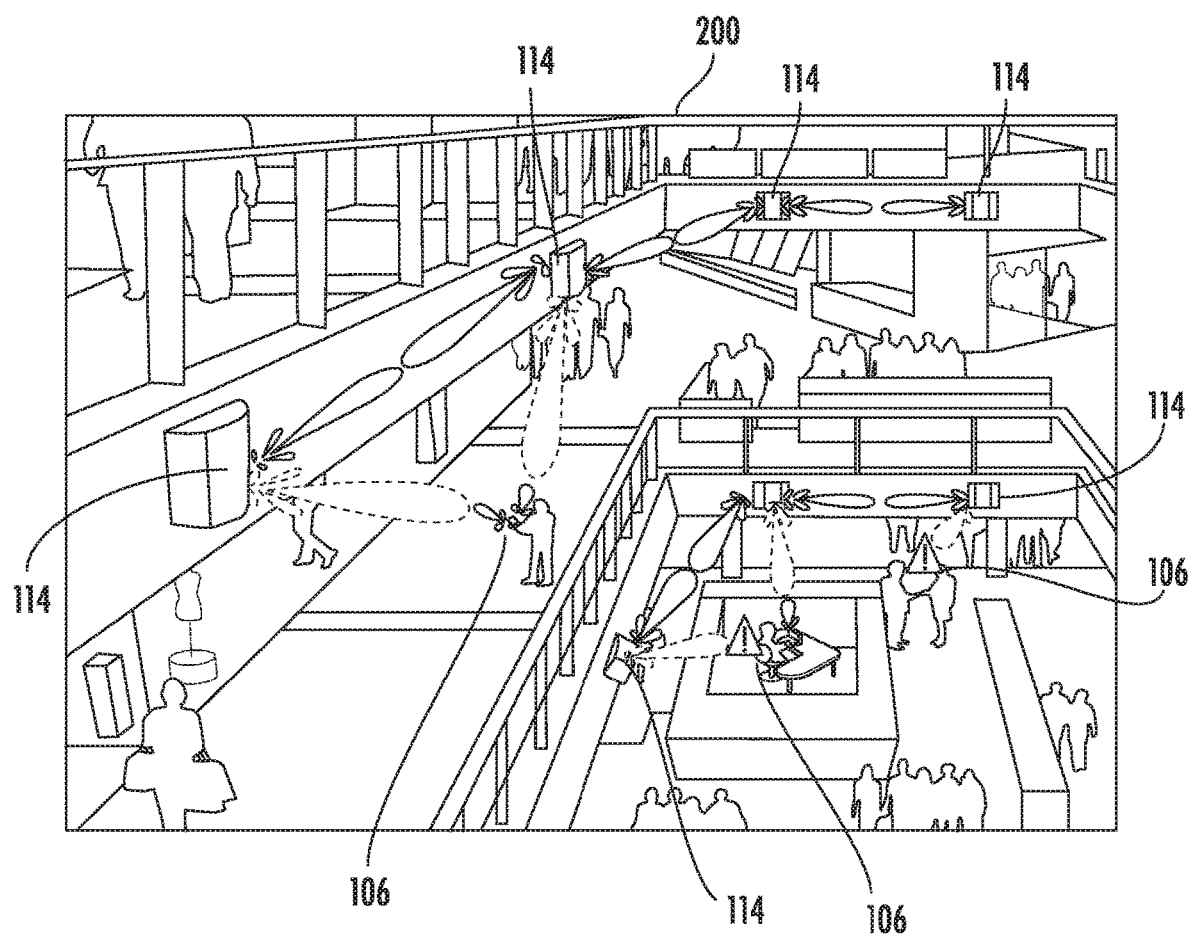
FIG. 2 is an example of a building environment where MAAs are deployed and configured to radiate multiple beams to wireless client devices within the building environment.
Figure 3:
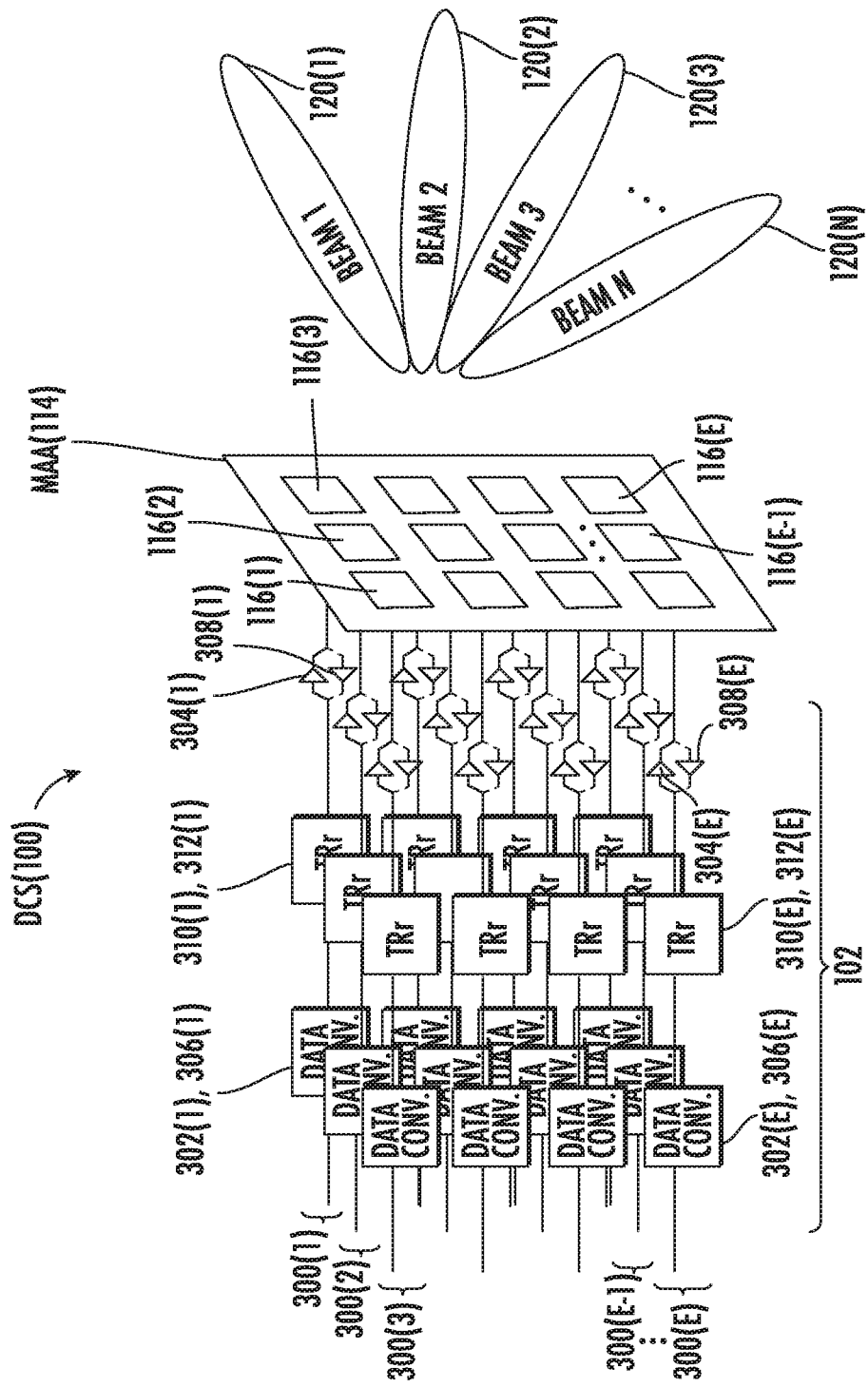
FIG. 3 is an example of a fully digital beamforming circuit that can be employed in the radio node in the communications system in FIG. 1A to support digital beamforming communications signals for multiple service providers using shared radio resources.
Figure 4:
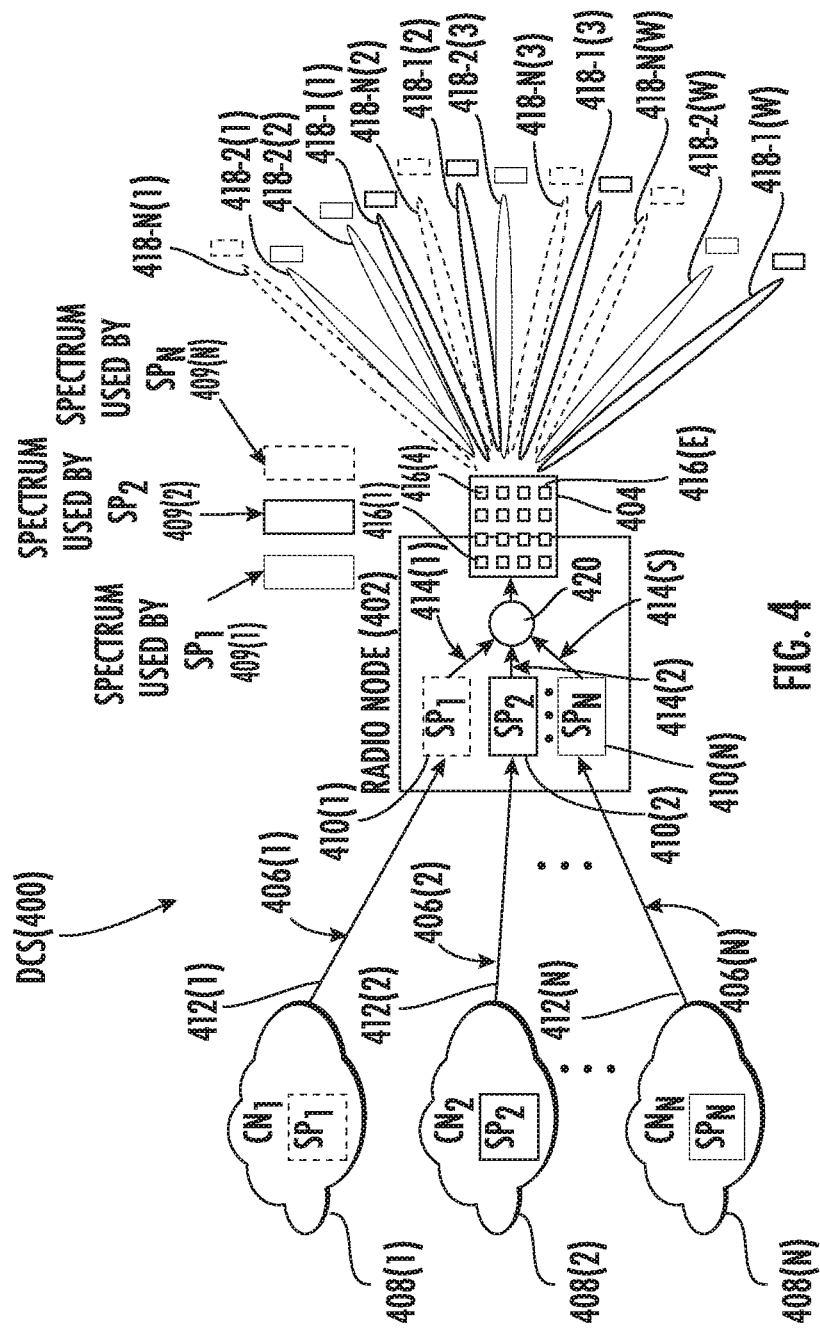
FIG. 4 is a schematic diagram of an exemplary communications system that includes a multi-operator radio node coupled to common antenna array, wherein the multi-operator radio node is configured to combine signal streams of the spectrum of the service providers directed to the same antenna element in the antenna array to form signal beams in individual spectrum layers of the service providers.

In this regard, FIG. 4 is a schematic diagram of an exemplary communications system 400 that includes a multi-operator radio node 402 coupled to common antenna array 404, which may be a massive antenna array (MAA). A MAA is an antenna that includes a large number of antenna elements (e.g., 64 or more). The multi-operator radio node 402 is a circuit that includes RF front end signal processing circuits and at least a portion of the stack layer of base station (e.g., eNodeBs, gNodeBs) for the multiple service providers supported. In the communications system 400 in FIG. 4, as discussed in more detail below, the multi-operator radio node 402 is configured to receive a digital downlink communications signal 406(1)-406(N) from service providers $SP_1$-$SP_N$, 408(1)-408(N) as signal sources. The multi-operator radio node 402 includes respective signal processor circuits 410(1)-410(N) for the supported service provider 408(1)-408(N) that are configured to receive the downlink communications signal 406(1)-406(N). The service providers $SP_1$-$SP_N$, 408(1)-408(N) may be cellular service providers as an example. For example, the downlink communications signal 406(1)-406(N) may be received from a respective evolved packet core (EPC) network $CN_1$-$CN_N$ of the respective service provider 408(1)-408(N) through a respective interface 412(1)-412(N). Each service provider 408(1)-408(N) has a spectrum 409(1)-409(N) (i.e., one or more frequency bands) of operation in which the downlink communications signal 406(1)-406(N) is transmitted to reach wireless client devices.

With continuing reference to FIG. 4, the signal processor circuits 410(1)-410(N) in the multi-operator radio node 402 include respective modems that are each configured to process the respective received downlink communications signal 406(1)-406(N) for the spectrum of its supported service provider 408(1)-408(N) to form a respective downlink signal 414(1)-414(S) in the respective individual spectrum of the service providers 408(1)-408(N). For example, the signal processor circuits 410(1)-410(N) can include physical layer circuits to implement the physical layer functions for the service providers 408(1)-408(N). The downlink signals 414(1)-414(S) are each comprised of a plurality of downlink signal streams which are directed to individual antenna elements 416(1)-416(E) in the antenna array 404 by the respective signal processor circuits 410(1)-410(N) to form a plurality of downlink signal beams 418-1(1)-418-1(W), 418-2(1)-418-2(W), . . . , 418-N(1)-418-N(W). For example, the downlink signal beams 418-1(1)-418-1(W), 418-2(1)-418-2(W), . . . , 418-N(1)-418-N(W) could be downlink beamforming signal beams, which are each single-input, single-output (SISO) signal streams that are received at the receivers of subscriber devices. As another example, the downlink signal beams 418-1(1)-418-1(W), 418-2(1)-418-2(W), . . . , 418-N(1)-418-N(W) could include two or more multiple-input, multiple-output (MIMO) components to form MIMO streams. As another example, the downlink signal beams 418-1(1)-418-1(W), 418-2(1)-418-2 (W), . . . , 418-N(1)-418-N(W) could be MU-MIMO streams where energy is radiated from the antenna elements 416(1)-416(E) in the antenna array 404, wherein MU-MIMO streams are SISO streams to each subscriber device or multiple MIMO streams to each subscriber device.

Beamforming or spatial filtering is a signal processing technique for directional signal transmission and/or reception. This is achieved by coherently combining the energy radiated from the antenna elements 416(1)-416(E) in the antenna array 404 in a way that signal streams at particular angles experience constructive interference while others experience destructive interference. Beamforming can be used at both downlink transmission and uplink reception in order to achieve spatial selectivity. For example, the front end of 5G radio nodes, especially at frequencies above 2.5 GigaHertz (GHz) will include a MAA and supporting RF processing circuit elements. Beamforming is typically employed only when there is little or ideally no signal reflections, which usually occurs in higher frequency millimeter (mm) waves. With beamforming in this example, the plurality of downlink signal beams 418-1(1)-418-1(W), 418-2(1)-418-2(W), . . . , 418-N(1)-418-N(W) can be transmitted all the way from a transmitter to the receiver. The plurality of downlink signal beams 418-1(1)-418-1(W), 418-2(1)-418-2(W), . . . , 418-N(1)-418-N(W) in this case may provide a SISO stream to a subscriber device, or include two or more MIMO components (e.g., 2×2 MIMO per beam is most common and usually achieved by transmitting two cross polarized beams to each subscriber device, transmitted through two sets of cross polarized antenna elements). This allows each subscriber device not only to benefit from the beamforming, but to also get theoretically double throughput in the case of 2×2 MIMO.

In lower frequencies, where a reflection rich environment exists, multi-user (MU) MIMO (MU-MIMO) algorithms can be used. In MU-MIMO, energy radiated from the multiple antenna elements, such as antenna elements 416(1)-416(E) in the antenna array 404, may go through reflections and arrive to a subscriber device antenna from multiple directions. MU-MIMO may provide a SISO stream to each subscriber device or provide multiple MIMO streams (e.g., 2) to each subscriber device as in the case of beamforming. Thus, beamforming and MU-MIMO can support multiple users, using the same radio resources (in terms of time and frequency), exploiting spatial orthogonality. With continuing reference to FIG. 4, the signal processor circuits 410(1)-410(N) direct or route downlink signal streams of the downlink signals 414(1)-414(S) to the individual antenna elements 416(1)-416(E) in the antenna array 404 based on precoding and signal processing. Signal beams 418-1(1)-418-1(W) are in the spectrum of the service provider 408(1) and contain downlink communications signals for service provider 408(1). Signal beams 418-2(1)-418-2(W) are in the spectrum of the service provider 408(2) and contain downlink communications signals for service provider 408(2). Signal beams 418-N(1)-418-N(W) are in the spectrum of the service provider 408(N) and contain downlink communications signals for service provider 408(N). The multi-operator radio node 402 in FIG. 4 supports the multiple service providers 408(1)-408(N), because the downlink signal streams in the respective downlink signals 414(1)-414(S) that are routed to the same antenna element 416(1)-416(E) in the antenna array 404 are linearly combined in a combining circuit 420 before being routed to the individual antenna elements 416(1)-416(E) in the antenna array 404. As a result, the antenna array 404 supports '1-W' signal beams in 'N' spectrum layers of the service providers 408(1)-408(N), wherein 'W' is the number of signal beams, and 'N' is the number of sharing service providers 408(1)-408(N) and spectrum layers. This allows the multi-operator radio node 402 and the antenna array 404 to be shared for the multiple service providers 408(1)-408(N) for reduced size and cost. Thus, each service provider 408(1)-408(N) uses its own spectrum such that the capacity of the multi-operator radio node 402 is not split between the different service providers 408(1)-408(N). The multi-operator radio node 402 allows less radio nodes in the communications system 400 to be used to service a given area needed to be serviced by the service providers 408(1)-408(N), as opposed to providing a radio node for each service provider 408(1)-408(N) in the area.

Figure 5A:
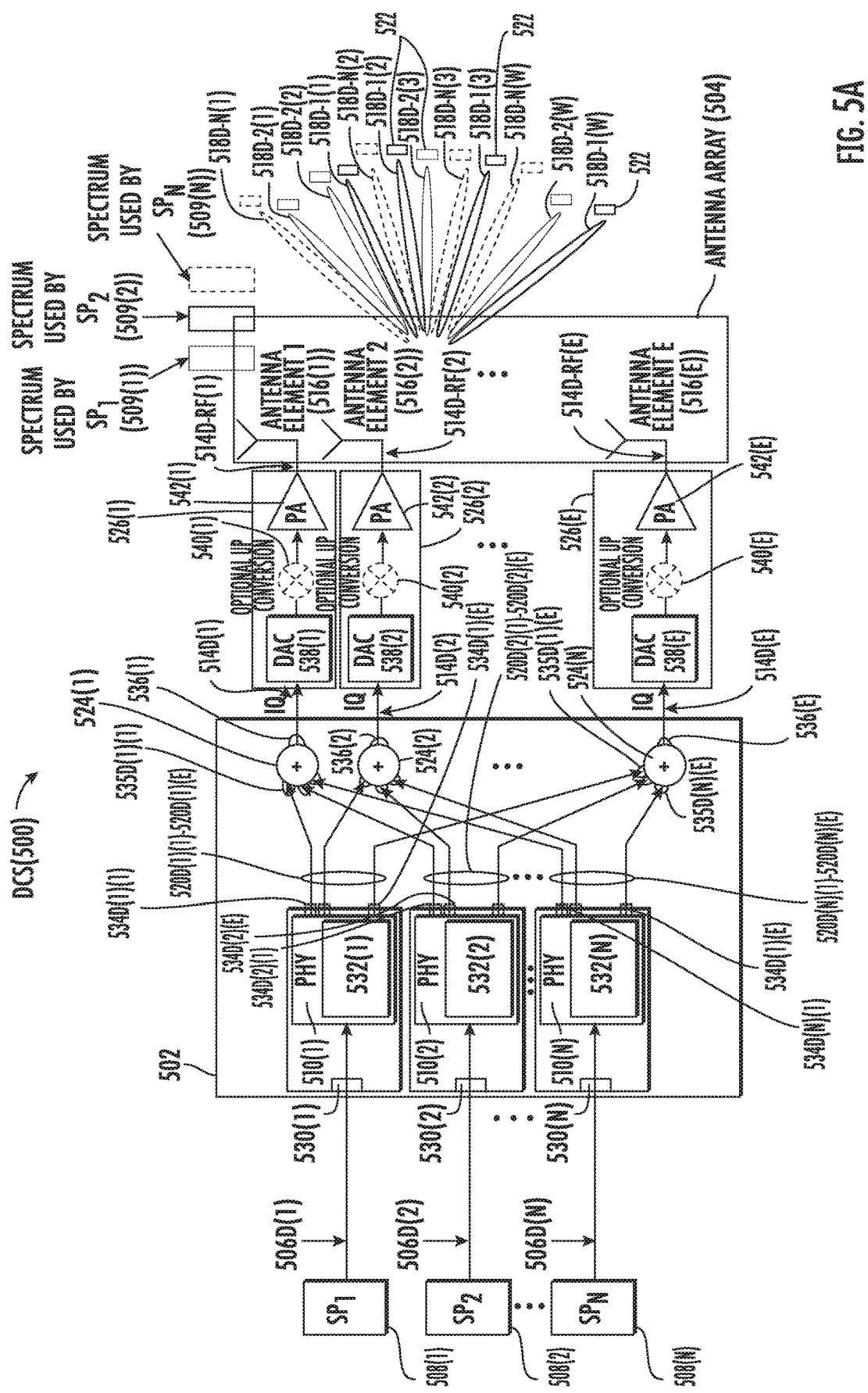
FIG. 5A illustrates downlink components of an exemplary fully digital multi-operator radio node supporting the forming of the fully digital signal streams for the spectrum of the service providers, which are combined into combined fully digital signal streams of the spectrum of the service providers and directed to the same antenna element in the antenna array to form signal beams in individual spectrum layers of the service providers to form downlink signal beams.
Figure 5B:
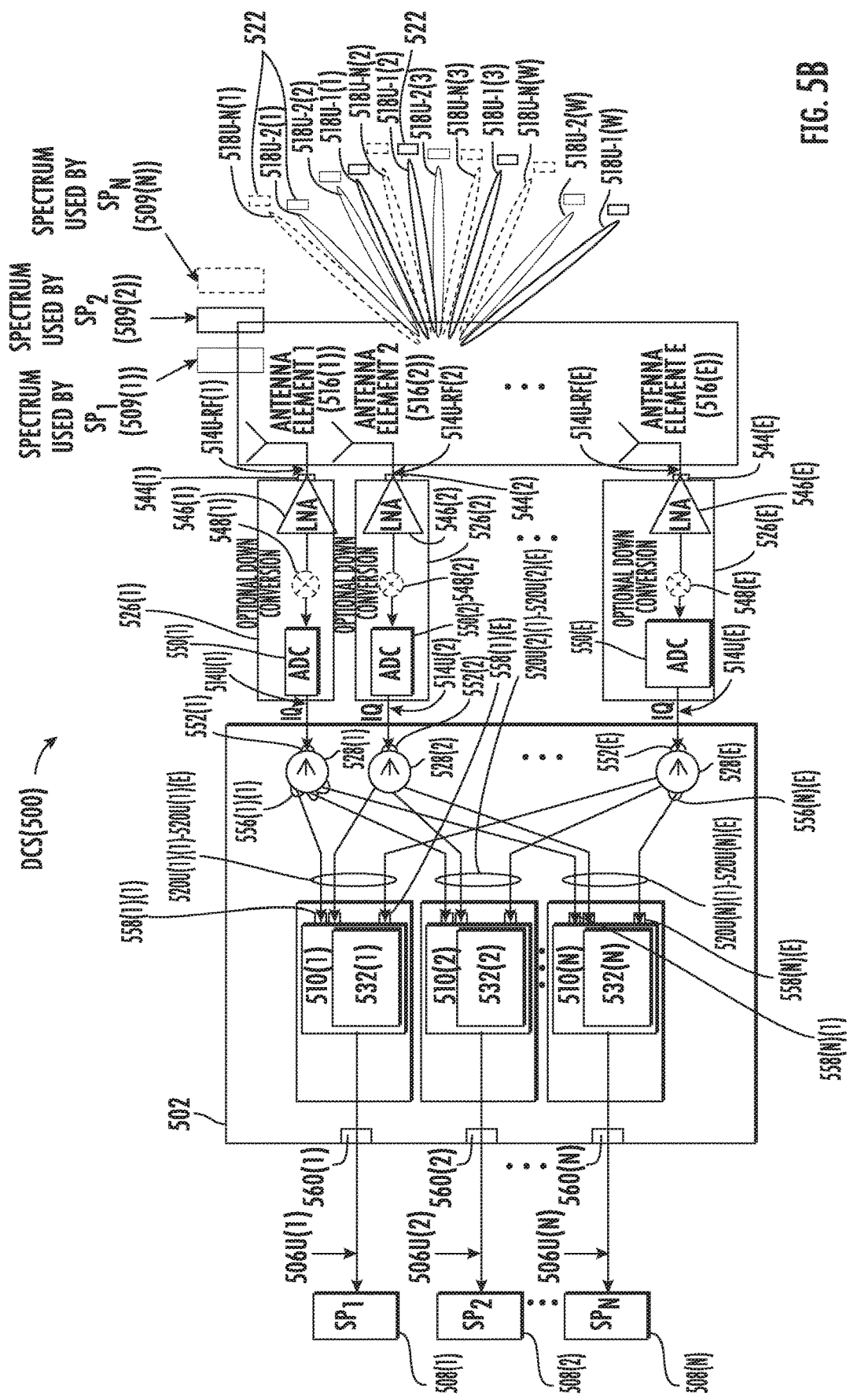
FIG. 5B illustrates uplink components of an exemplary multi-operator radio node configured to process received uplink beam signals into individual combined uplink signal streams, which are then split into individual uplink signal streams in the spectrum of the service providers and processed into uplink communication signals communicated to the service providers.

A communications system 500 that includes a multi-operator radio node 502 that supports sharing of a common antenna array 504 while supporting the individual spectrum of multiple service providers in a fully digital configuration is shown in FIGS. 5A and 5B. FIG. 5A illustrates downlink components of an exemplary fully digital multi-operator radio node 502 supporting the processing of fully digital downlink communications signals 506D(1)-506(N) into downlink signal streams 520D(1)(1)-520D(N)(E) in the spectrum of service providers 508(1)-508(N), $SP_1$-$SP_N$. The downlink signal streams 520D(1)(1)-520D(N)(E) are combined into combined downlink signal streams 514D(1)-514D(E) that are directed or routed to antenna elements 516(1)-516(E) in the antenna array 504 to form signal beams 518D-1(1)-518D-1(W), 518D-2(1)-518D-2(W), . . . , 518D-N(1)-518D-N(W) in individual spectrum layers of the service providers 508(1)-508(N) to be distributed to wireless client devices 522. As will be discussed in more detail below, signal processing circuits 510(1)-510(N) of the multi-operator radio node 502 are configured to form respective downlink signal streams 520D(1)(1)-520D(1)(E), 520D(2)(1)-520D(2)(E), . . . , 520D(N)(1)-520D(N)(E) from the received respective downlink communications signals 506D(1)-506D(N) to be distributed to the antenna elements 516(1)-516(E) of the antenna array 504 to form the respective signal beams 518D-1(1)-518D-1(W), 518D-2(1)-518D-2(W), . . . , 518D-N(1)-518D-N(W). The downlink signal streams 520D(1)(1)-520D(1)(E), 520D(2)(1)-520D(2)(E), . . . , 520D(N)(1)-520D(N)(E) for the multiple service providers 508(1)-508(N) to be routed to the same antenna element 516(1)-516(E) in the antenna array 504 are combined by respective downlink combiner circuits 524(1)-524(E) before being distributed to respective RF chain circuits 526(1)-526(E) to be distributed to the respective antenna element 516(1)-516(E). As examples, the downlink combiner circuits 524(1)-524(E) may be realized in a processor like a digital signal processor (DSP), or other logical circuits such as a field programmable gate array (FPGA).

Also note that in some examples, some of the RF chain circuits 526(1)-526(E) are configured to be shared through a respective downlink combiner circuit 524(1)-524(E), while another RF chain circuit(s) 526(1)-526(E) may not be shared through a respective downlink combiner circuit 524(1)-524(E) and instead be coupled directly to a downlink signal processing output port 534D(1)(1)-534D(N)(E).

FIG. 5B illustrates uplink components of the multi-operator radio node 502 that are configured to receive uplink signal beams 518U-1(1)-518U-N(W) from the wireless client devices 522 in the spectrum of the service providers 508(1)-508(N), and process the uplink signal beams 518U-1(1)-518U-N(W) into individual combined uplink signal streams 514U(1)-514U(E). As discussed in more detail below, the combined uplink signal streams 514U(1)-514U(E) are coupled to the respective RF chain circuits 526(1)-526(E) for processing the combined uplink signal streams 514U(1)-514U(E), which are then split into individual uplink signal streams 520U(1)(1)-520U(1)(E), 520U(2)(1)-520U(2)(E), . . . , 520U(N)(1)-520U(N)(E) by respective uplink splitter circuits 528(1)-528(E) to be provided to respective signal processing circuits 510(1)-510(N). The signal processing circuits 510(1)-510(N) process the uplink signal streams 520U(1)(1)-520U(1)(E), 520U(2)(1)-520U(2)(E), . . . , 520U(N)(1)-520U(N)(E) in the spectrum of their respective supported service providers 508(1)-508(N) as uplink communications signals 506U(1)-506U(N) distributed to the service providers 508(1)-508(N).

With reference back to FIG. 5A, each signal processing circuit 510(1)-510(N) has a downlink input port 530(1)-530(N) configured to receive a respective downlink communications signal 506D(1)-506D(N) from a respective service provider 508(1)-508(N) as a signal source. In this example, each signal processing circuit 510(1)-510(N) includes a modem 532(1)-532(N) that is coupled to a respective downlink input port 530(1)-530(N) to receive the respective downlink communications signal 506D(1)-506D(N). For example, the modems 532(1)-532(N) can include dedicated physical (PHY) layer circuits to implement the physical layer functions for its respective service provider 508(1)-508(N). The physical layer circuits of each modem 532(1)-532(N) process a different spectrum 509(1)-509(N) for its respective supported service provider 508(1)-508(N) for serving its wireless client device users with the downlink signal beams 518D-1(1)-518D-N(W). Each modem 532(1)-532(N) is configured to form a plurality of downlink signal streams 520D(1)(1)-520D(1)(E), 520D(2)(1)-520D(2)(E), . . . , 520D(N)(1)-520D(N)(E) in the individual spectrum 509(1)-509(N) of its respective supported service provider 508(1)-508(N). Each modem 532(1)-532(N) is configured to distribute each of the formed downlink signal streams 520D(1)(1)-520D(1)(E), 520D(2)(1)-520D(2)(E), . . . , 520D(N)(1)-520D(N)(E) to a respective downlink signal processing output ports 534D(1)(1)-534D(1)(E), 534D(2)(1)-534D(2)(E), . . . , 534D(N)(1)-534D(N)(E). In this example, the multi-operator radio node 502 is configured in a fully digital architecture, meaning that each antenna element 516(1)-516(E) in the antenna array 504 is fed by a digital downlink signal stream that is converted to a RF signal in the respective RF chain circuits 526(1)-526(E) without additional analog phase manipulations, as discussed in more detail below. Thus, the downlink signal streams 520D(1)(1)-520D(1)(E), 520D(2)(1)-520D(2)(E), . . . , 520D(N)(1)-520D(N)(E) in this example are digital signals, which may be represented by in-phase/quadrature (I/Q) signal components of the modulated downlink signal streams, for example. By represented, it can mean that the received downlink communications signals 506D(1)-506D(N) are I/Q modulated signals of the modulated downlink signal streams or I/Q signal components of the modulated downlink signal streams. The modems 532(1)-532(N) determine where to steer the downlink signal streams 520D(1)(1)-520D(1)(E), 520D(2)(1)-520D(2)(E), . . . , 520D(N)(1)-520D(N)(E) to then control the routing of the downlink signal streams 520D(1)(1)-520D(1)(E), 520D(2)(1)-520D(2)(E), . . . , 520D(N)(1)-520D(N)(E) to respective antenna elements 516(1)-516(E) in the antenna array 504.

With continuing reference to FIG. 5A, the downlink signal streams 520D(1)(1)-520D(1)(E), 520D(2)(1)-520D(2)(E), . . . , 520D(N)(1)-520D(N)(E) formed by the respective signal processing circuits 510(1)-510(N) as digital signal streams are coupled to respective downlink combiner input ports 535D(1)(1)-535D(1)(E), 535D(2)(1)-535D(2)(E), . . . , 535D(N)(1)-535D(N)(E) of the respective downlink combiner circuits 524(1)-524(E). The downlink combiner circuits 524(1)-524(E) may be digital summation circuits. The downlink signal streams 520D(1)(1), 520D(2)(1), . . . , 520D(N)(1) are fed to the respective downlink combiner input ports 535D(1)(1), 535D(2)(1), . . . , 535D(N)(1) of the respective downlink combiner circuits 524(1)-524(E). Downlink signal streams 520D(N)(1), 520D(N)(2), . . . , 520D(N)(E) are fed to the respective downlink combiner input ports 535D(N)(1), 535D(N)(2), . . . , 535D(N)(E) of the respective downlink combiner circuits 524(1)-524(E). Each downlink combiner circuits 524(1)-524(E) is configured to combine the received downlink signal streams 520D(1)(1)-520D(1)(E), 520D(2)(1)-520D(2)(E), . . . , 520D(N)(1)-520D(N)(E) into combined downlink signal streams 514D(1)-514D(E) as digital signals on respective downlink combiner output ports 536(1)-536(E). For example, downlink combiner circuit 524(1) is configured to combine the downlink signal streams 520D(1)(1), 520D(2)(1), . . . , 520D(N)(1) into a combined downlink signal stream 514D(1) on downlink combiner output port 536(1). The combining of the downlink signal streams 520D(1)(1)-520D(1)(E), 520D(2)(1)-520D(2)(E), . . . , 520D(N)(1)-520D(N)(E) is possible without causing interference between downlink signal streams of the different service providers 508(1)-508(N), because each different service provider 508(1)-508(N) supports downlink communications signals 506(1)-506(N) in different, non-overlapping frequency bands.

With continuing reference to FIG. 5A, the downlink combiner output ports 536(1)-536(E) are coupled to respective RF chain circuits 526(1)-526(E) such that the combined downlink signal streams 514D(1)-514D(E) are fed to the respective RF chain circuits 526(1)-526(E). RF chain circuits 526(1)-526(E) are coupled to respective antenna elements 516(1)-516(E) in the antenna array 504. The RF chain circuits 526(1)-526(E) are configured to process the respective combined downlink signal streams 514D(1)-514D(E) into respective combined RF downlink signal streams 514D-RF(1)-514D-RF(E), which are coupled to respective antenna elements 516(1)-516(E) in the antenna array 504 to form the downlink signal beams 518D-1(1)-518D-N(W). Each RF chain circuit 526(1)-526(E) in this example includes a digital-to-analog (D/A) converter circuit 538(1)-538(E), a frequency up-converter circuit 540(1)-540(E), and a power amplifier (PA) circuit 542(1)-542(E). The D/A converter circuits 538(1)-538(E) are configured to process the combined digital downlink signal streams 514D(1)-514D(E) into combined RF downlink signal streams 514D-RF(1)-514D-RF(E). No phase shifting is performed by the RF chain circuit 526(1)-526(E) in this example, because the multi-operator radio node 502 is configured in a fully digital architecture wherein the signal processing circuits 510(1)-510(N) are configured to fully steer the downlink signal streams 520D(1)(1)-520D(1)(E), 520D(2)(1)-520D(2)(E), . . . , 520D(N)(1)-520D(N)(E) to the desired user through the antenna array 504. In this example, the combined RF downlink signal streams 514D-RF(1)-514D-RF(E) are frequency up-converted to the frequency of their supported service provider 508(1)-508(N) by the optional frequency up-converter circuits 540(1)-540(E), which are then fed to respective PA circuits 542(1)-542(E) to amplify the combined RF downlink signal streams 514D-RF(1)-514D-RF(E) into combined amplified RF downlink signal streams 514D-RF(1)-514D-RF(E) to be fed to respective antenna elements 516(1)-516(E) in the antenna array 504 to form the downlink signal beams 518D-1(1)-518D-N(W). Alternatively, the PA circuits 542(1)-542(E) may be directly coupled to the D/A converter circuits 538(1)-538(E).

Figure 6:
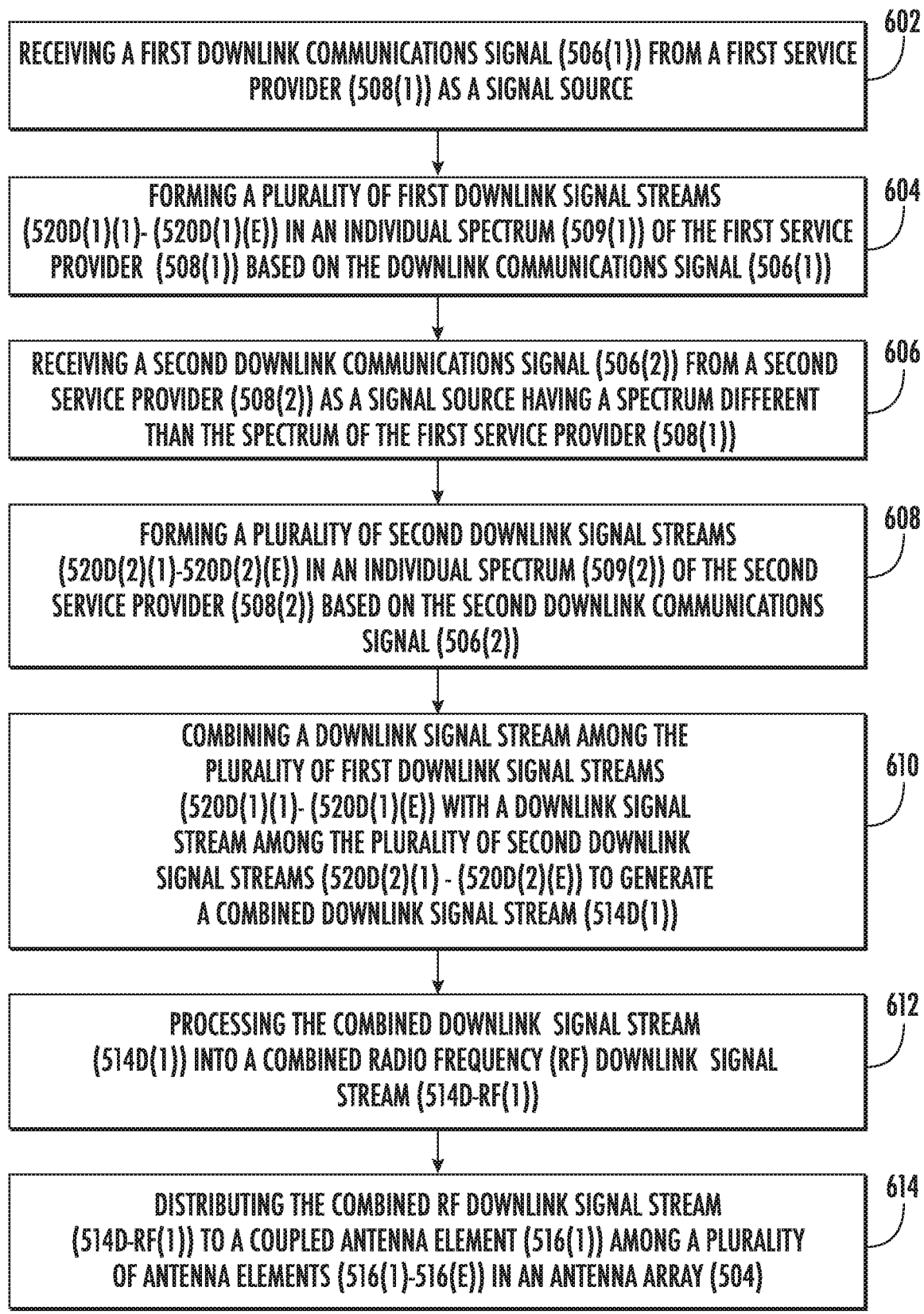
FIG. 6 is a flowchart illustrating an exemplary process of the multi-operator radio node in the communications system in FIG. 5A forming downlink signal streams for the spectrum of the service providers and combining the fully digital downlink signal streams directed to the same antenna element in the antenna array to form downlink signal beams in individual spectrum layers of the service providers.

Also note that in some examples, some of the RF chain circuits 526(1)-526(E) are configured to be shared through a respective uplink splitter circuits 528(1)-528(E), while another RF chain circuit(s) 526(1)-526(E) may not be shared through a respective uplink splitter circuit 528(1)-528(E) and instead be coupled directly to an uplink signal processing output port 560(1)(1)-560(N)(E). FIG. 6 is a flowchart illustrating an exemplary process 600 of the multi-operator radio node 502 in the communications system 500 in FIG. 5A forming downlink signal streams 520D(1)(1)-520D(1)(E), 520D(2)(1)-520D(2)(E), . . . , 520D(N)(1)-520D(N)(E) for the spectrum 509(1)-509(N) of the service providers 508(1)-508(N) and combining the fully digital downlink signal streams 520D(1)(1)-520D(1)(E), 520D(2)(1)-520D(2)(E), . . . , 520D(N)(1)-520D(N)(E) directed (i.e., coupled) to the same antenna element 516(1)-516(E) in the antenna array 504 to form downlink signal beams 518D-1(1)-518D-N(W) in individual spectrum layers of the service providers 508(1)-508(N). The process 600 in FIG. 6 is described in reference to the multi-operator radio node 502 in the communications system 500 in FIG. 5A as an example. In this regard, as illustrated in FIG. 6, the process 600 includes receiving a first downlink communications signal 506(1) from a first service provider 508(1) as a signal source (block 602 in FIG. 6). The process 600 also includes forming a plurality of first downlink signal streams 520D(1)(1)-520D(1)(E) in an individual spectrum 509(1) of the first service provider 508(1) based on the downlink communications signal 506(1) (block 604 in FIG. 6). The process 600 also includes receiving a second downlink communications signal 506(2) from a second service provider 508(2) as a signal source having a spectrum different than the spectrum of the signals of the first service provider 508(1) (block 606 in FIG. 6). In other words, the spectrum used by the second service provider 508(2) is different than the spectrum used by the first service provider 508(1) in this example. The process 600 also includes forming a plurality of second downlink signal streams 520D(2)(1)-520D(2)(E) in an individual spectrum 509(2) of the second service provider 508(2) based on the second downlink communications signal 506(2) (block 608 in FIG. 6). The process 600 also includes combining a downlink signal stream among the plurality of first downlink signal streams 520D(1)(1)-520D(1)(E) with a downlink signal stream among the plurality of second downlink signal streams 520D(2)(1)-520D(2)(E) to generate a combined downlink signal stream 514D(1) (block 610 in FIG. 6). The process 600 also includes processing the combined downlink signal stream 514D(1) into a combined RF downlink signal stream 514D-RF(1) (block 612 in FIG. 6). The process 600 also includes distributing the combined RF downlink signal stream 514D-RF(1) to a coupled antenna element 516(1) among the plurality of antenna elements 516(1)-516(E) in the antenna array 504 (block 614 in FIG. 6).

The uplink operation of the multi-operator radio node 502 will now be described with reference back to FIG. 5B. In this regard, as shown in FIG. 5B, each RF chain circuit 526(1)-526(E) is also configured to receive a respective combined RF uplink signal stream 514U-RF(1)-514U-RF(E) on a respective uplink input port 544(1)-544(E) coupled to a respective antenna element 516(1)-516(E) in the antenna array 504. Each RF chain circuit 526(1)-526(E) in this example includes a respective low noise amplifier (LNA) circuit 546(1)-546(E), a frequency down-converter circuit 548(1)-548(E) and an analog-to-digital (A/D) converter circuit 550(1)-550(E). The LNA circuits 546(1)-546(E) are configured to amplify the respective combined RF uplink signal streams 514U-RF(1)-514U-RF(E). The optional frequency down-converter circuits 548(1)-548(E) are configured to downconvert the frequency of the combined RF uplink signal stream 514U-RF(1)-514U-RF(E).

Alternatively, the LNA circuits 546(1)-546(E) may be directly coupled to the A/D converter circuits 550(1)-550(E). The A/D converter circuits 550(1)-550(E) are configured to convert the respective combined RF uplink signal streams 514U-RF(1)-514U-RF(E) into digital combined uplink signal streams 514U(1)-514U(E), which may be I/Q modulated signal streams. The digital combined uplink signal streams 514U(1)-514U(E) may contain spectrums 509(1)-509(N) of all the service providers 508(1)-508(N).

With continuing reference to FIG. 5B, the RF chain circuits 526(1)-526(E) are coupled to a respective uplink splitter input port 552(1)-552(E) of an uplink splitter circuit 528(1)-528(E). The uplink splitter circuits 528(1)-528(E) may be uplink digital splitter circuits. The uplink splitter circuits 528(1)-528(E) each have a plurality of uplink splitter output ports 556(1)(1)-556(N)(E) that are routed to uplink signal processing input ports 558(1)(1)-558(N)(E) of the signal processing circuits 510(1)-510(N). Each uplink splitter circuit 528(1)-528(E) is configured to split the digital combined uplink signal streams 514U(1)-514U(E) on the uplink splitter input ports 552(1)-552(E) to uplink signal streams 520U(1)(1)-520U(1)(E), 520U(2)(1)-520U(2)(E), . . . , 520U(N)(1)-520U(N)(E) that are routed to the respective uplink signal processing input ports 558(1)(1)-558(N)(E) of the signal processing circuits 510(1)-510(N). The modems 532(1)-532(N) of the signal processing circuits 510(1)-510(N) are configured to form the uplink communications signals 506U(1)-506U(N) from the respective uplink signal streams 520U(1)(1)-520U(1)(E), 520U(2)(1)-520U(2)(E), . . . , 520U(N)(1)-520U(N)(E) in the individual spectrum 509(1)-509(N) of the service providers 508(1)-508(N) and distribute the uplink communications signal 506U(1)-506U(N) to respective uplink signal processing output ports 560(1)-560(N) to be communicated to the respective service providers 508(1)-508(N).

Figure 7:
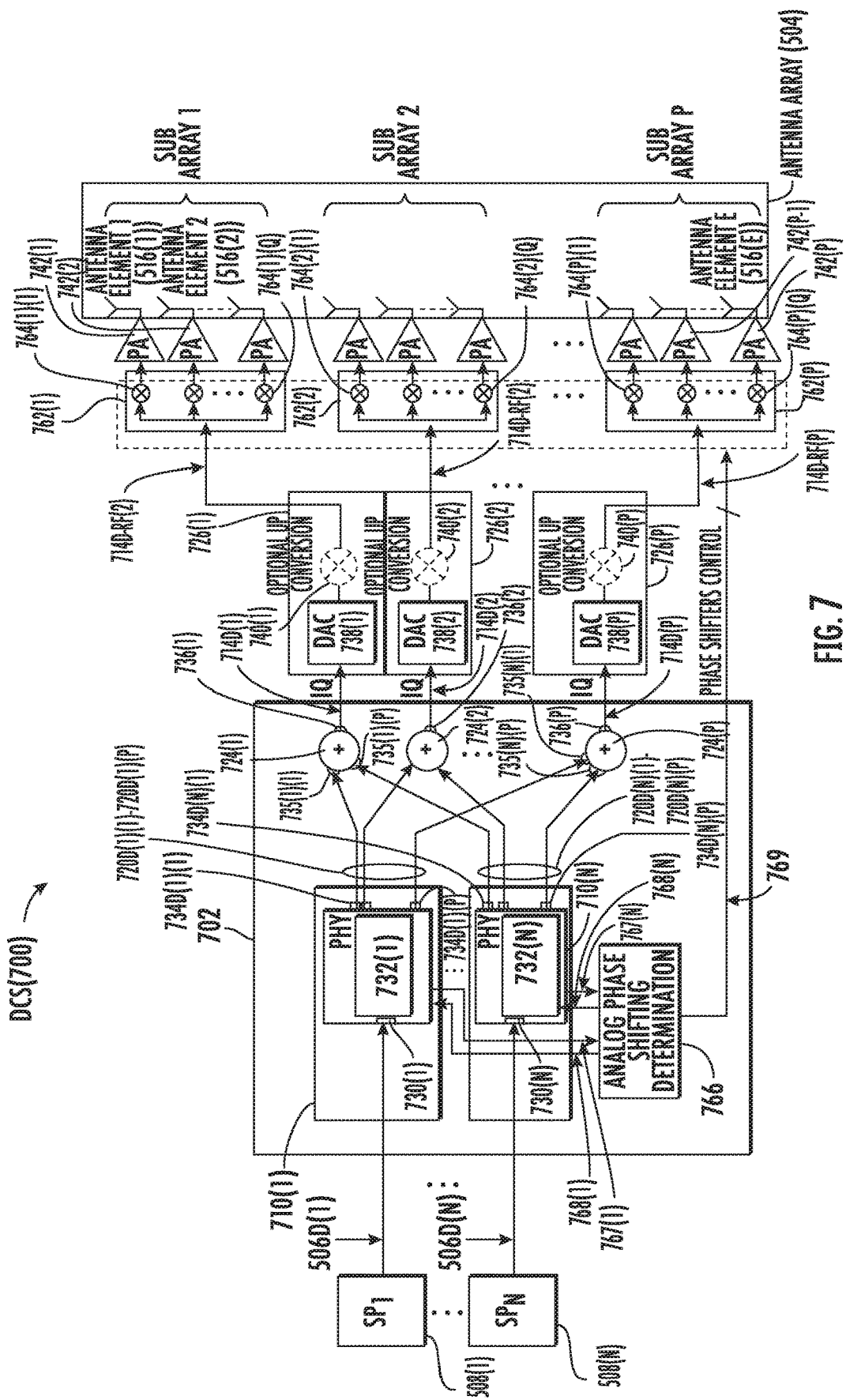
FIG. 7 is a schematic diagram of an exemplary communications system that includes a hybrid digital-analog multi-operator radio node coupled to common antenna array in an antenna sub-array architecture, wherein the hybrid digital-analog multi-operator radio node is configured to form digital signal streams for the spectrum of the service providers for a specific analog phase, and combine the digital signal streams of the spectrum of the service providers directed to a same sub-array of antenna elements in the antenna array that are phase shifted according to a phase shift control signal generated by the hybrid digital-analog multi-operator radio node, to form signal beams in individual spectrum layers of the service providers.

In the multi-operator radio node 502 in FIGS. 5A and 5B, the signal processing circuits 510(1)-510(N) are configured to fully control the direction of the beams and to maximize the spatial separation (i.e., steering) between the combined digital downlink signal streams 514D(1)-514D(E). However, other alternatives are possible to control the direction of the (i.e., the spatial separation) of the digital downlink signal streams directed to the antenna elements 516(1)-516(E) of the antenna array 504. For example, FIG. 7 is a schematic diagram of another exemplary communications system 700 that includes a hybrid digital-analog multi-operator radio node 702 coupled to the antenna array 504 in an antenna sub-array architecture that includes controlling of the direction of signal streams in both a digital and analog means. The hybrid digital-analog multi-operator radio node 702 in FIG. 7 is configured to form combined digital downlink signal streams 714D(1)-714D(P) similar to the formed combined digital downlink signal streams 514D(1)-

Figure 8:
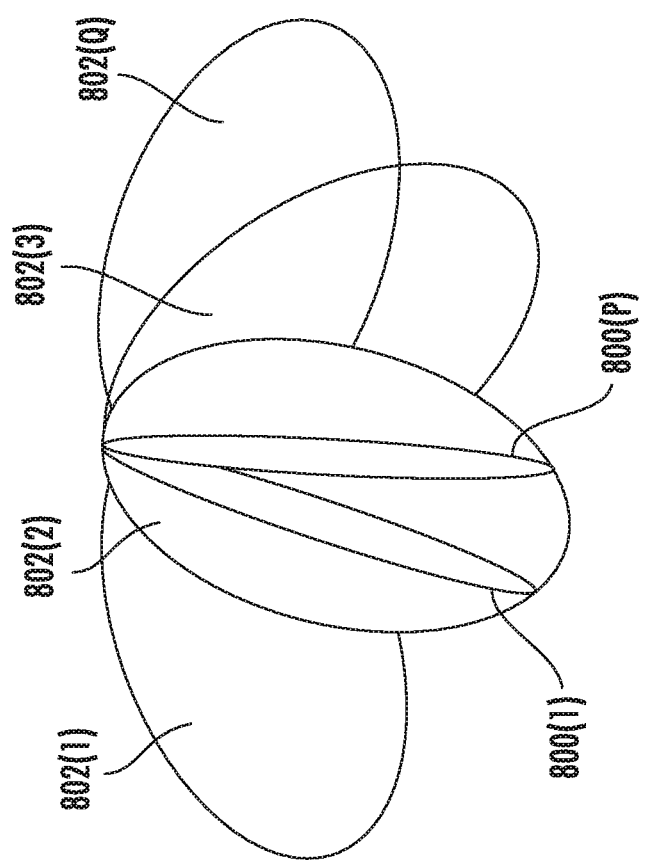
FIG. 8 is a schematic diagram of an antenna pattern controlled by the hybrid digital-analog multi-operator radio node in FIG. 7, wherein the direction of the signal streams emitted by the antenna array is based on digital phase control to control the narrow phase within a wide phase, and analog phase shifters to control to which wide phase the narrow phase signal streams are directed.

514D(E) formed by the multi-operator radio node 502 in FIG. 5A. However, as discussed in more detail below, the hybrid digital-analog multi-operator radio node 702 in FIG. 7 is configured to control each antenna sub-array of combined digital downlink signal streams 714D(1)-714D(P) to be formed in narrow beams 800(1) ... 800(P) within a wider beam area 802(2) as shown in FIG. 8. For example, each wider beam area 802(1)-802(Q) may be shifted sixty (60) degrees from an adjacent wider beam area 802(1)-802(Q). Analog phase shift is then employed to phase shift each antenna sub-array of combined digital downlink signal streams 714D(1)-714D(P) to be within a desired wider beam area 802(1)-802(Q). In this manner, the signal beams emitted by the antenna array 504 are controlled in both a digital and analog phase. This can reduce the number of D/A converters 738(1)-738(P) provided in RF chain circuits 726(1)-726(P) to 'P' units down from 'E' units, for example, in the multi-operator radio node 502 in FIG. 5A, because analog phase shifter circuits 762(1)-762(P) are then employed for each antenna sub-array 1-P to phase shift the combined digital downlink signal streams 714D(1)-714D(P) into different phases 1-Q. The number of antenna sub-arrays 'P' times the number of different phases 'Q' equals 'E', which is the number of antenna elements 516(1)-516(E) in the antenna array 504.

With reference to FIG. 7, the multi-operator radio node 702 includes a plurality of signal processing circuits 710(1)-710(N) that each have a downlink input port 730(1)-730(N) configured to receive a respective downlink communications signal 506D(1)-506D(N) from a respective service provider 508(1)-508(N) as a signal source. In this example, each signal processing circuit 710(1)-710(N) includes a modem 732(1)-732(N) that is coupled to a respective downlink input port 730(1)-730(N) to receive the respective downlink communications signal 506D(1)-506D(N). For example, the modems 732(1)-532(N) can include dedicated physical (PHY) layer circuits to implement the physical layer functions for its respective service provider 508(1)-508(N). The physical layer circuits of each modem 732(1)-732(N) process different spectrums for its respective supported service provider 508(1)-508(N) for serving its wireless client device users with the downlink signal beams. Each modem 732(1)-732(N) is configured to form a plurality of the downlink signal streams 720D(1)(1)-720D(1)(P)-720D(N)(1)-720D(N)(P) in the individual spectrum of its respective supported service provider 508(1)-508(N). Each modem 732(1)-732(N) is configured to distribute each of the formed downlink signal streams 720D(1)(1)-720D(1)(P)-720D(N)(1)-720D(N)(P) to a respective downlink signal processing output port 734D(1)(1)-734D(1)(P)-734D(N)(1)-734D(N)(P). In this example, the multi-operator radio node 702 is configured in a hybrid digital-analog architecture. The downlink signal streams 720D(1)(1)-720D(1)(P)-720D(N)(1)-720D(N)(P) in this example are digital signals, which may be I/Q components of the modulated downlink signal streams for example. The modems 732(1)-732(N) determine where to steer the downlink signal streams 720D(1)(1)-720D(1)(P)-720D(N)(1)-720D(N)(P) in narrow beams, which are then analog phase shifted into wider beam areas as discussed below.

With continuing back to FIG. 7, the downlink signal streams 720D(1)(1)-720D(1)(P)-720D(N)(1)-720D(N)(P) formed by the respective signal processing circuits 710(1)-710(N) as digital signal streams are coupled to respective downlink combiner input ports 735D(1)(1)-735D(1)(P)-735D(N)(1)-735D(N)(P) of respective downlink combiner circuits 724(1)-724(P). The downlink combiner circuits 724(1)-724(P) may be digital summation circuits. As examples, the downlink combiner circuits 724(1)-724(P) may be realized in a processor like a digital signal processor (DSP), or other logical circuits such as a field programmable gate array (FPGA). The downlink signal streams 720D(1)(1), 720D(2)(1), ..., 720D(N)(1) are fed to the respective downlink combiner input ports 735D(1)(1), 735D(2)(1), ..., 735D(N)(P) of the respective downlink combiner circuits 724(1)-724(P). Downlink signal streams 720D(N)(1), 720D(N)(2), ..., 720D(N)(P) are fed to the respective downlink combiner input ports 735D(N)(1), 735D(N)(2), ..., 735D(N)(E) of the respective downlink combiner circuits 724(1)-724(P). Each downlink combiner circuit 724(1)-724(P) is configured to combine the received downlink signal streams 720D(1)(1)-720D(1)(P)-720D(N)(1)-720D(N)(P) into combined downlink signal streams 714D(1)-714D(P) as digital signals on respective downlink combiner output ports 736(1)-736(P). The combining of the downlink signal streams 720D(1)(1)-720D(1)(P)-720D(N)(1)-720D(N)(P) is possible without causing interference between downlink signal streams of the different service providers 508(1)-508(N), because each different service provider 508(1)-508(N) supports downlink communications signals 506(1)-506(N) in different, non-overlapping frequency bands.

With continuing reference to FIG. 7, the downlink combiner output ports 736(1)-736(P) are coupled to respective RF chain circuits 726(1)-726(P) such that the combined downlink signal streams 714D(1)-714D(P) are fed to the respective RF chain circuits 726(1)-726(P). RF chain circuits 726(1)-726(P) are coupled to respective analog phase shifter circuits 762(1)-762(P) arranged in antenna sub-arrays 1-P. The analog phase shifter circuits 762(1)-762(P) are coupled to the antenna elements 516(1)-516(E) of the antenna array 504. The RF chain circuits 726(1)-726(P) are configured to process the respective combined digital downlink signal streams 714D(1)-714D(P) into respective combined RF downlink signal streams 714D-RF(1)-714D-RF(P), which are coupled to respective antenna elements 516(1)-516(E) in the antenna array 504 to form the downlink signal beams. Each RF chain circuit 726(1)-726(P) in this example includes a D/A converter circuit 738(1)-738(P) and a frequency up-converter circuit 740(1)-740(P). The D/A converter circuits 738(1)-738(P) are configured to process the combined digital downlink signal streams 714D(1)-714D(E) into combined RF downlink signal streams 714D-RF(1)-714D-RF(P). The combined RF downlink signal streams 714D-RF(1)-714D-RF(P) are directed to respective analog phase shifter circuits 762(1)-762(P), which each include respective analog phase shifters 764(1)(1)-764(P)(Q) configured to phase shift their respective received combined RF downlink signal streams 714D-RF(1)-714D-RF(P) into one of 1-Q phases as phase shifted combined RF downlink signal streams 714D-RF(1)-714D-RF(P). A PA circuit 742(1)-742(P) is coupled to the respective phase shifters 764(1)(1)-764(P)(Q) to amplify the phase shifted combined RF downlink signal streams 714D-RF(1)-714D-RF(P).

One possible way to control the phase shifting provided by the analog phase shifter circuits 762(1)-762(P) is through an analog phase shifting determination circuit 766. The analog phase shifting determination circuit 766 is configured to generate an analog phase shifting control signal 769 to the analog phase shifter circuits 762(1)-762(P) to adjust the analog phase shifters 764(1)(1)-764(P)(Q) of the P antenna sub-arrays for supporting Q equally spaced signal beams based on information signals 767(1)-767(N) from the signal processing circuits 710(1)-710(N). The analog phase shifting determination circuit 766 provides the information on the analog signal beams to the signal processing circuits 710(1)-710(N) as information signals 768(1)-768(N). The signal processing circuits 710(1)-710(N) can use this information while creating the narrower digital downlink signal streams 720(1)(1)-720D(1)(P)-720D(N)(1)-720D(N)(P) within the analog signal beams and perform the beam management procedures towards their subscribers, independently.

Note that the references to "ports" in the description of the multi-operator radio node 702 in FIG. 7 can include, but is not limited to, a physical port or connection. The port may be a logical port that provides a logical connection. Some or all of the described functionality of the multi-operator radio node 702 may be performed in processing circuits, such as a FPGA or DSP, as examples. Signals related to different signal streams may be routed internally or be computed and routed in different serial and or parallel manners.

Figure 9:
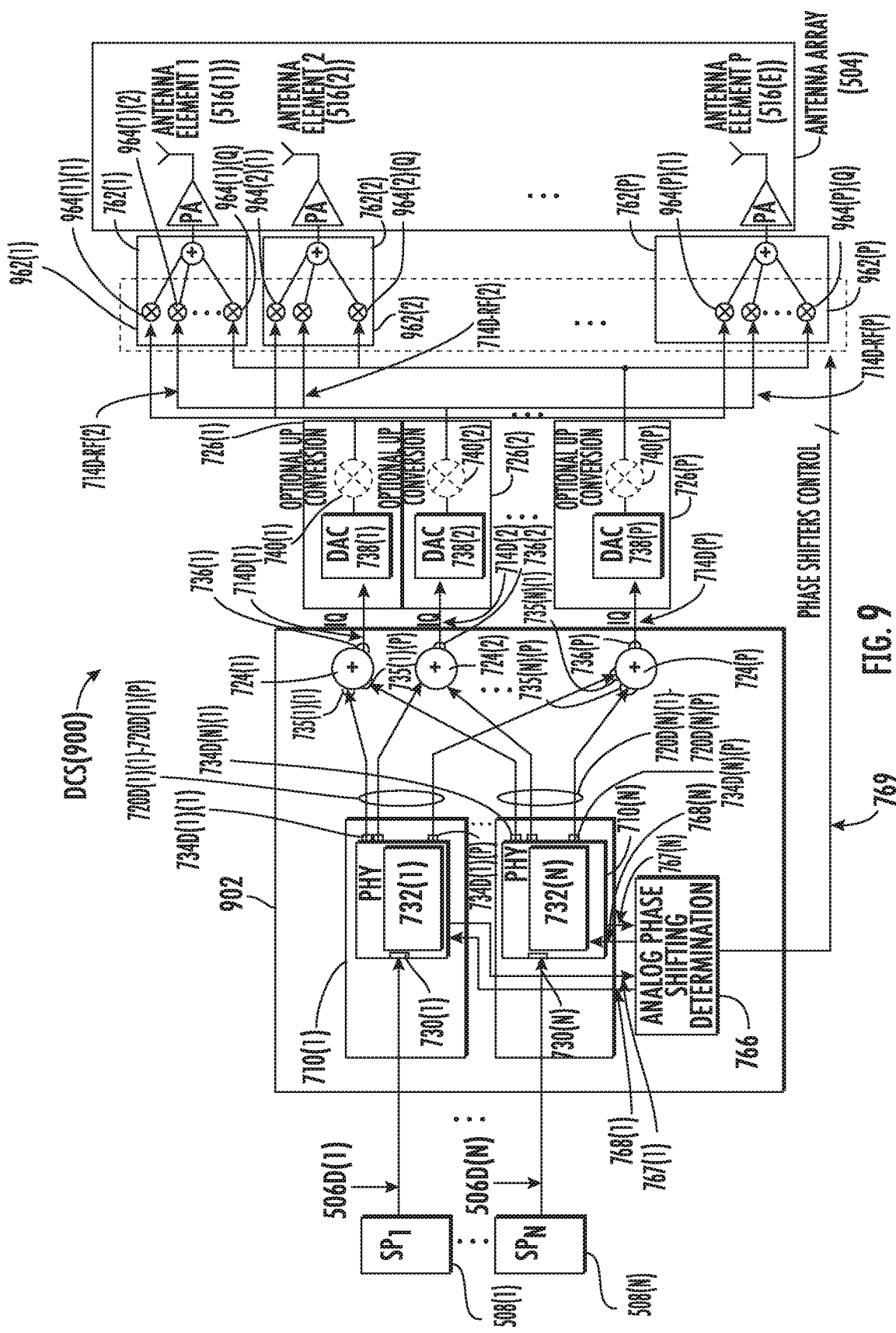
FIG. 9 is a schematic diagram of an exemplary communications system that includes a hybrid digital-analog multi-operator radio node coupled to common antenna array supporting a full connection architecture.

FIG. 9 is a schematic diagram of another exemplary communications system 900 that also includes a hybrid digital-analog multi-operator radio node 902 coupled to common antenna array 504 like in FIG. 7, but arranged in a full-connection architecture. Common elements between the communications system 700 in FIG. 7 and the communications system 900 in FIG. 9 are shown with common element numbers and will not be re-described. In the communications system 900 in FIG. 9, analog phase shifter circuits 962(1)-962(P) are provided for each respective antenna sub-array 1-P. However, in this embodiment, the RF chain circuits 726(1)-726(P) are coupled to analog phase shifter circuits 962(1)-962(P) such that the respective combined RF downlink signal streams 714D-RF(1)-714D-RF(P) can be provided to any analog phase shifter circuits 962(1)-962(P) for full connectivity. Each analog phase shifter circuit 962(1)-962(P) includes 1-Q analog phase shifters 964(1)(1)-964(P)(Q), such that there are P*Q total analog phase shifters 964(1)(1)-964(P)(Q). One possible way to control the phase shifting provided by the analog phase shifter circuits 962(1)-962(P) is through the analog phase shifting determination circuit 766 that is configured to generate the analog phase shifting control signal 769 to the analog phase shifter circuits 962(1)-962(P) to adjust the analog phase shifters 964(1)(1)-964(P)(Q) of the P antenna sub-arrays. Alternatively, the phase shifting can be implemented by digital phase shifter circuits in a digital domain. In this example, the analog phase shifting determination circuit 766 provides the information on the analog signal beams to the signal processing circuits 710(1)-710(N) as information signals 768(1)-768(N). The signal processing circuits 710(1)-710(N) can use this information while creating the narrower digital downlink signal streams 720D(1)(1)-720D(1)(P)-720D(N)(1)-720D(N)(P) within the analog signal beams and perform the beam management procedures towards their subscribers, independently. The analog phase shifting determination circuit 766 can determine the information to provide in the information signals 768(1)-768(N) about the signal beams based on a compromise between the requirements received in information signals 767(1)-767(N) from the signal processing circuits 710(1)-710(N) and/or based on beam management procedures towards the subscribers of the service providers 708(1)-708(N).

Note that the references to "ports" in the description of the multi-operator radio node 902 in FIG. 9 can include, but is not limited to, a physical port or connection. The port may be a logical port that provides a logical connection. Some or all of the described functionality of the multi-operator radio node 902 may be performed in processing circuits, such as a FPGA or DSP, as examples. Signals related to different signal streams may be routed internally or be computed and routed in different serial and or parallel manners.

Figure 10:
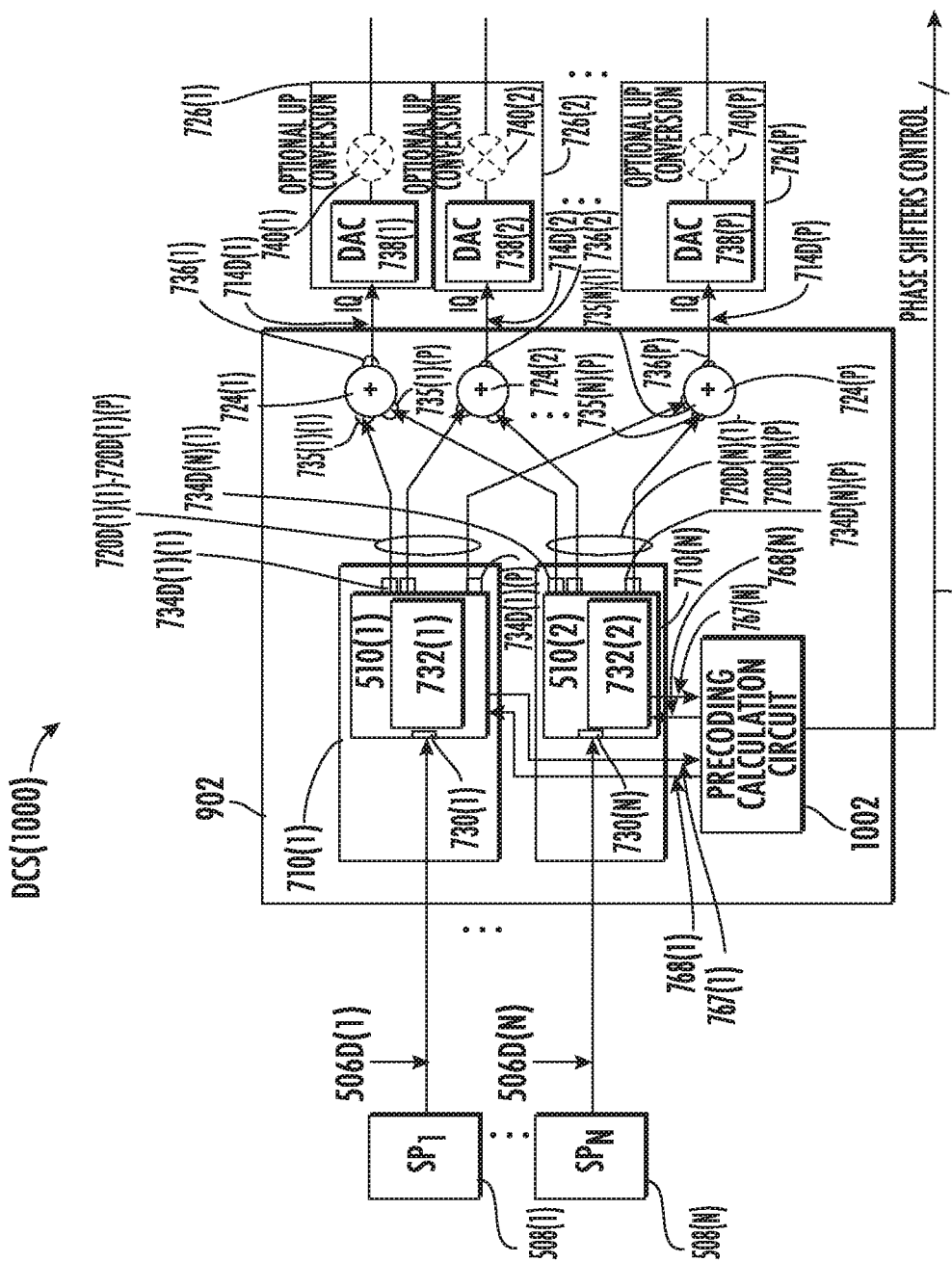
FIG. 10 is a schematic diagram of another exemplary hybrid digital-analog multi-operator radio node coupled to common antenna array supporting either an antenna sub-array or full connection architecture.

FIG. 10 is a schematic diagram of another exemplary communications system 1000 that also includes the hybrid digital-analog multi-operator radio node 902 in FIG. 9. In the communications system 900 in FIG. 9, the analog phase shifter circuits 962(1)-962(P) are provided for each respective antenna sub-array 1-P. However, in this embodiment, a precoding calculation circuit 1002 is provided and is used for serving the signal processing circuits 710(1)-710(N) and the analog phase shifters circuits 962(1)-962(P). The precoding calculation circuit 1002 receives the information signals 767(1)-767(N) from the signal processing circuits 710(1)-710(N) that can include information such as channel state, "best serving beam," pre-coding matrix indicator (PMI), and/or other information. The precoding calculation circuit 1002 calculates analog and digital precoding weights for the signal processing circuits 710(1)-710(N) and this result is provided as information signals 768(1)-768(N) to the signal processing circuits 710(1)-710(N) to control the direction of the combined downlink signal streams 714D(1)-714D(P) and to generate the analog phase shifting control signal 769 to the analog phase shifter circuits 962(1)-962(P) to adjust the analog phase shifters 964(1)(1)-964(P)(Q) of the P antenna sub-arrays.

Note that the references to "ports" in the description of the multi-operator radio node 902 in FIG. 10 can include, but is not limited to, a physical port or connection. The port may be a logical port that provides a logical connection. Some or all of the described functionality of the multi-operator radio node 902 may be performed in processing circuits, such as a FPGA or DSP, as examples. Signals related to different signal streams may be routed internally or be computed and routed in different serial and or parallel manners.

Any of the multi-operator radio nodes 402, 502, 702, and 902 in FIGS. 4-5B, 7, 9, and 10 may be configured to provide and support any type of communications services and/or other communications services beyond communication services. The communications circuits may support other RF communications services, which may include, but are not limited to, US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink), medical telemetry frequencies, WLAN, CBRS, WiMax, WiFi, Digital Subscriber Line (DSL), mmWave spectrum, 5G (NR), and LTE, etc.

Figure 11:
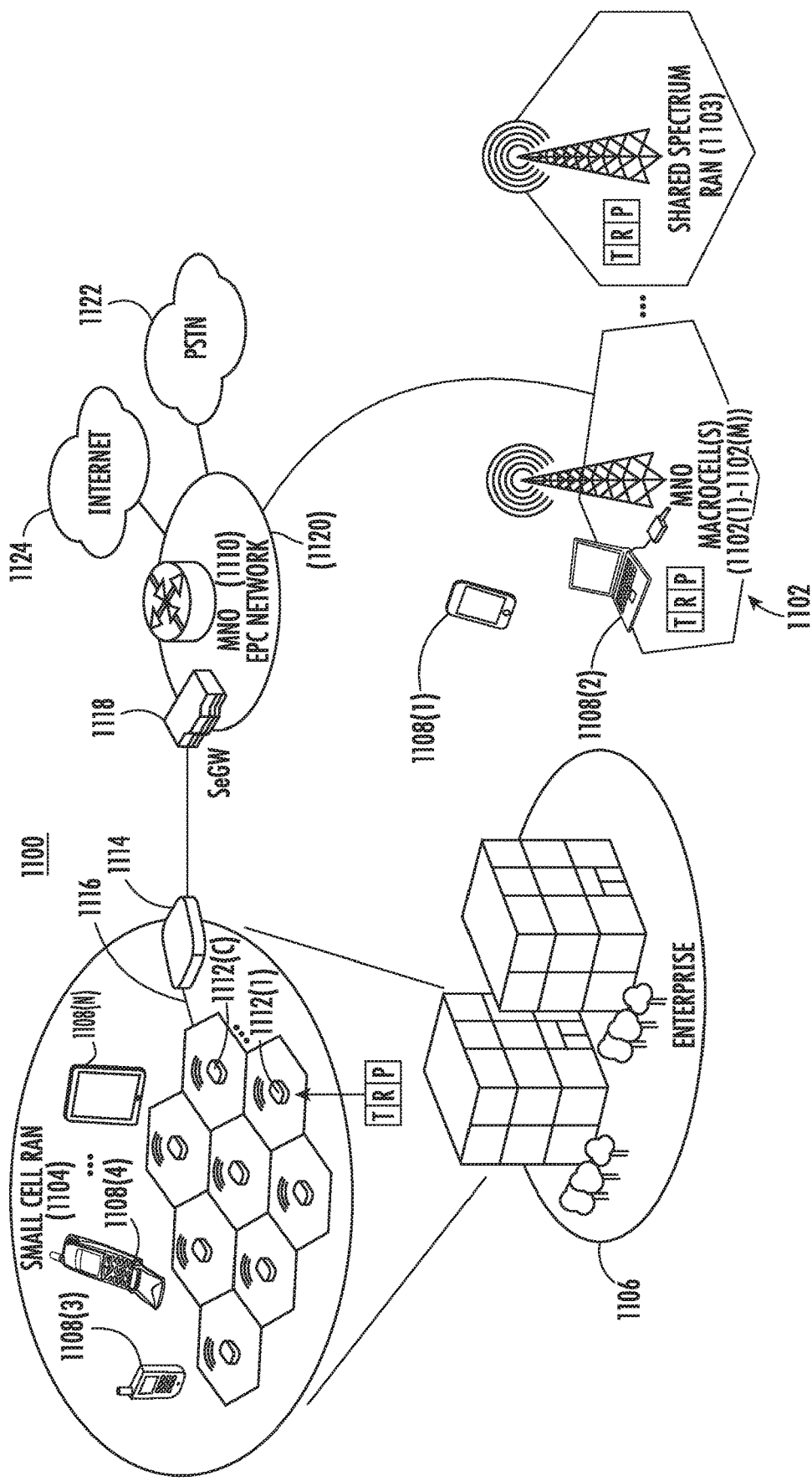
FIG. 11 is a schematic diagram of an exemplary mobile telecommunications environment that includes an exemplary macrocell radio access network (RAN) and an exemplary small cell RAN employing a multi-operator radio node located within an enterprise environment and configured to service mobile communications between a user mobile communications device to a mobile network operator (MNO), wherein the multi-operator radio node is configured to combine signal streams of the spectrum of the service providers directed to the same antenna element in the antenna array to form signal beams in individual spectrum layers of the service providers.

Multi-operator radio nodes configured to be coupled to a common antenna array and configured to combine signal streams of the spectrum of the service providers directed to the same antenna element in the antenna array to form signal beams in individual spectrum layers of the service providers and the communications circuits disclosed herein, including but not limited to the multi-operator radio nodes 402, 502, 702, and 902 in FIGS. 4-5B, 7, 9, and 10 can also be employed in different types of communications systems that provide a radio access network (RAN), including, but not limited to, macrocell systems, small cell systems, remote radio heads (RRH) systems, etc. For example, FIG. 11 is a schematic diagram of an exemplary mobile telecommunications environment 1100 (also referred to as "environment 1100") that includes exemplary macrocell RANs 1102(1)-1102(M) ("macrocells 1102(1)-1102(M)") and an exemplary small cell RAN 1104 located within an enterprise environment 1106 and configured to service mobile communications between a user mobile communications device 1108(1)-1108(N) to a mobile network operator (MNO) 1110. A serving RAN for a user mobile communications device 108(1)-108(N) is a RAN or cell in the RAN in which the user mobile communications devices 108(1)-108(N) have an established communications session with the exchange of mobile communications signals for mobile communications. Thus, a serving RAN may also be referred to herein as a serving cell. For example, the user mobile communications devices 1108(3)-1108(N) in FIG. 11 are being serviced by the small cell RAN 1104, whereas user mobile communications devices 1108(1) and 1108(2) are being serviced by the macrocell 1102. The macrocell 1102 is an MNO macrocell in this example. However, a shared spectrum RAN 1103 (also referred to as "shared spectrum cell 1103") includes a macrocell in this example and supports communications on frequencies that are not solely licensed to a particular MNO and thus may service user mobile communications devices 1108(1)-1108(N) independent of a particular MNO. For example, the shared spectrum cell 1103 may be operated by a third party that is not an MNO and wherein the shared spectrum cell 1103 support citizens broadband radio service (CBRS). Also, as shown in FIG. 11, the MNO macrocell 1102, the shared spectrum cell 1103, and the small cell RAN 1104 can include multi-operator radio nodes, such as the multi-operator radio nodes 402, 502, 702, and 902 in FIGS. 4-5B, 7, 9, and 10. The MNO macrocell 1102, the shared spectrum cell 1103, and the small cell RAN 1104 may be neighboring radio access systems to each other, meaning that some or all can be in proximity to each other such that a user mobile communications device 1108(3)-1108(N) may be able to be in communications range of two or more of the MNO macrocell 1102, the shared spectrum cell 1103, and the small cell RAN 1104 depending on the location of user mobile communications devices 1108(3)-1108(N).

In FIG. 11, the mobile telecommunications environment 1100 in this example, is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1100 includes the enterprise 1106 in which the small cell RAN 1104 is implemented. The small cell RAN 1104 includes a plurality of small cell radio nodes (RNs) 1112(1)-1112(C). Each small cell radio node 1112(1)-1112(C) has a radio coverage area (graphically depicted in the drawings as a hexagonal shape) that is commonly termed a "small cell." A small cell may also be referred to as a femtocell, or using terminology defined by 3GPP as a Home Evolved Node B (HeNB). In the description that follows, the term "cell" typically means the combination of a radio node and its radio coverage area unless otherwise indicated.

In FIG. 11, the small cell RAN 1104 includes one or more services nodes (represented as a single services node 1114) that manage and control the small cell radio nodes 1112(1)-1112(C). In alternative implementations, the management and control functionality may be incorporated into a radio node, distributed among nodes, or implemented remotely (i.e., using infrastructure external to the small cell RAN 1104). The small cell radio nodes 1112(1)-1112(C) are coupled to the services node 1114 over a direct or local area network (LAN) connection 1116 as an example, typically using secure IPsec tunnels. The small cell radio nodes 1112(1)-1112(C) can include multi-operator radio nodes, such as the multi-operator radio nodes 402, 502, 702, and 902 in FIGS. 4-5B, 7, 9, and 10. The services node 1114 aggregates voice and data traffic from the small cell radio nodes 1112(1)-1112(C) and provides connectivity over an IPsec tunnel to a security gateway (SeGW) 1118 in a network 1120 (e.g, EPC network in a 4G network, or 5G Core in a 5G network) of the MNO 1110. The network 1120 is typically configured to communicate with a public switched telephone network (PSTN) 122 to carry circuit-switched traffic, as well as for communicating with an external packet-switched network such as the Internet 1124.

The environment 1100 also generally includes a node (e.g., eNodeB or gNodeB) base station, or "macrocell" 1102. The radio coverage area of the macrocell 1102 is typically much larger than that of a small cell where the extent of coverage often depends on the base station configuration and surrounding geography. Thus, a given user mobile communications device 1108(3)-1108(N) may achieve connectivity to the network 1120 (e.g, EPC network in a 4G network, or 5G Core in a 5G network) through either a macrocell 1102 or small cell radio node 1112(1)-1112(C) in the small cell RAN 1104 in the environment 1100.

Figure 12:
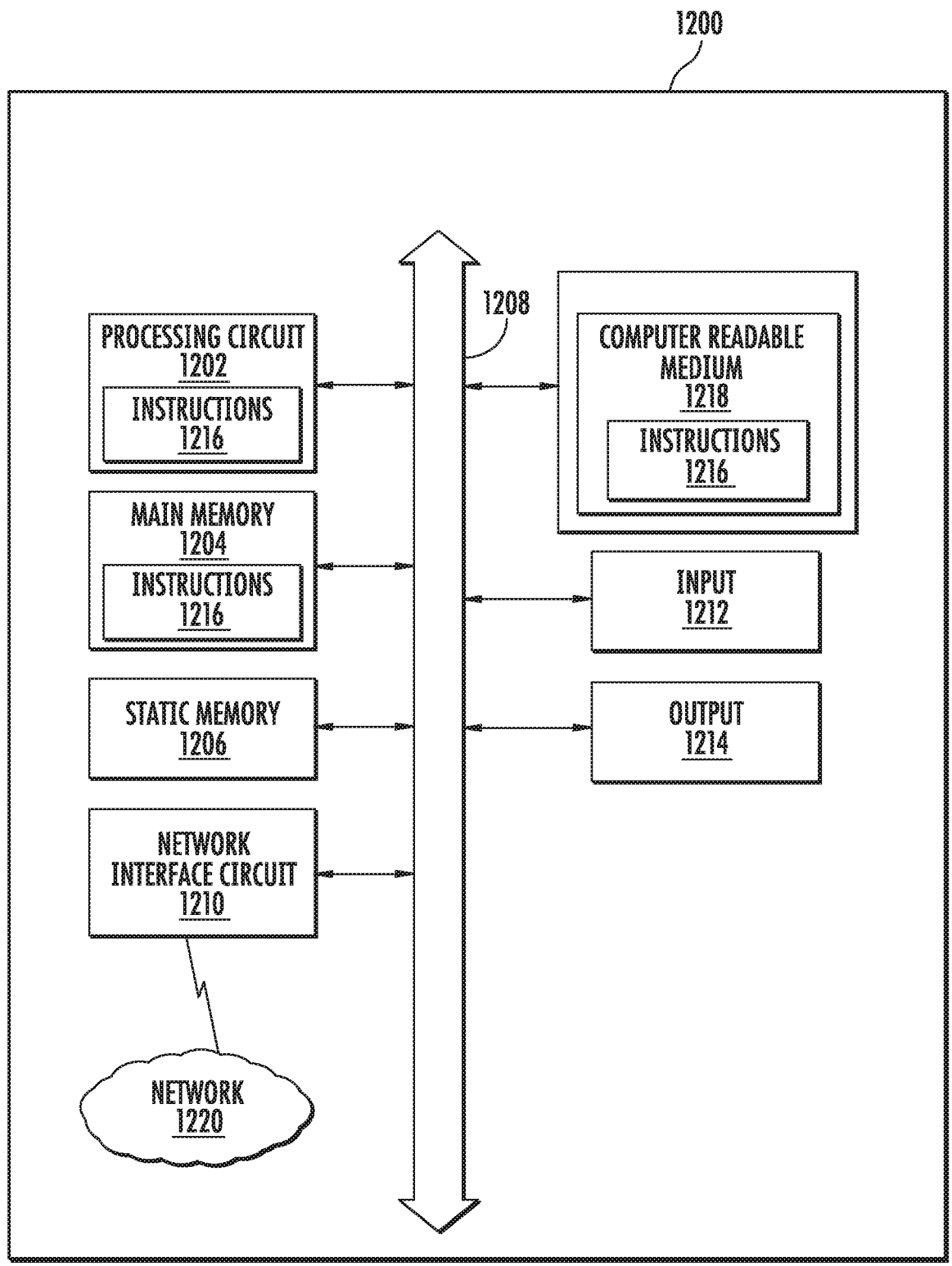
FIG. 12 is a schematic diagram of a representation of an exemplary computer system that can be included in or interface with any of the multi-operator radio nodes and/or signal processing circuits therein, including the multi-operator radio node in FIGS. 4-5B, 7, 9, and 10, wherein the exemplary computer system is adapted to execute instructions from an exemplary computer-readable media.

Any of the multi-operator radio nodes 402, 502, 702, and 902 in FIGS. 4-5B, 7, 9, and 10 and their circuits can include a computer system 1200, such as shown in FIG. 12. With reference to FIG. 12, the computer system 1200 includes a set of instructions for causing the multi-operator radio node component(s) to provide its designed functionality, including any of the functionality of the multi-operator radio nodes 402, 502, 702, and 902 in FIGS. 4-5B, 7, 9, and 10, and their circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1200 in this embodiment includes a processing device or processor 1202, a main memory 1204 (e.g., read-only memory (ROM), flash memory, dynamic random access memory (DRAM) such as synchronous DRAM (SDRAM), etc.), and a static memory 1206 (e.g., flash memory, static random access memory (SRAM), etc.), which may communicate with each other via a data bus 1208. Alternatively, the processing device 1202 may be connected to the main memory 1204 and/or static memory 1206 directly or via some other connectivity means. The processing device 1202 may be a controller, and the main memory 1204 or static memory 1206 may be any type of memory.

The processing device 1202 represents one or more general-purpose processing devices such as a microprocessor, central processing unit, or the like. More particularly, the processing device 1202 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1202 is configured to execute processing logic in instructions 1216 for performing the operations and steps discussed herein.

The computer system 1200 may further include a network interface circuit 1210. The computer system 1200 also may or may not include an input 1212 to receive input and selections to be communicated to the computer system 1200 when executing instructions. The computer system 1200 also may or may not include an output 1214, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1200 may or may not include a data storage device that includes instructions 1216 stored in a computer-readable medium 1218. The instructions 1216 may also reside, completely or at least partially, within the main memory 1204 and/or within the processing circuit 1202 during execution thereof by the computer system 1200, the main memory 1204 and the processing circuit 1202 also constituting computer-readable medium. The instructions 1216 may further be transmitted or received over a network 1220 via the network interface circuit 1210.

While the computer-readable medium 1218 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A radio node for distributing communications signals in a communications system, comprising:
 a first signal processing circuit, comprising:
  a first downlink input port configured to receive a first downlink communications signal from a first signal source associated with a first service provider; and a first modem coupled to the first downlink input port, the first modem configured to form a plurality of first downlink signal streams in an individual spectrum of the first service provider and distribute each of the plurality of first downlink signal streams to a respective downlink signal processing output port among a plurality of first downlink signal processing output ports;

a second signal processing circuit, comprising:
  a second downlink input port configured to receive a second downlink communications signal from a second signal source associated with a second service provider having a spectrum different than the spectrum of the first service provider;
  a second modem coupled to the second downlink input port, the second modem configured to form a plurality of second downlink signal streams in an individual spectrum of the second service provider and distribute each of the plurality of second downlink signal streams to a respective downlink signal processing output port among a plurality of second downlink signal processing output ports; and a plurality of downlink combiner circuits each comprising a first downlink combiner input port coupled to a first downlink signal processing output port among the plurality of first downlink signal processing output ports, a second downlink combiner input port coupled to a second downlink signal processing output port among the plurality of second downlink signal processing output ports, and a downlink combiner output port coupled to a respective radio-frequency (RF) chain circuit among a plurality of RF chain circuits;
  each downlink combiner circuit among the plurality of downlink combiner circuits configured to combine a downlink signal stream among the plurality of first downlink signal streams on the first downlink combiner input port and a downlink signal stream among the plurality of second downlink signal streams on the second downlink combiner input port to generate a combined downlink signal stream on the downlink combiner output port;

the plurality of RF chain circuits each coupled to a downlink combiner output port of a respective downlink combiner circuit among the plurality of downlink combiner circuits and a respective antenna element among a plurality of antenna elements in an antenna array;
  each RF chain circuit among the plurality of RF chain circuits configured to receive a respective combined downlink signal stream on the coupled downlink combiner output port, process the combined downlink signal stream into a combined RF downlink signal stream, and distribute the processed combined RF downlink signal stream to the coupled antenna element among the plurality of antenna elements in the antenna array.

2. The radio node of claim 1, further comprising:
a third signal processing circuit, comprising:
  a third downlink input port configured to receive third downlink communication information from a third signal source associated with a third service provider having a spectrum different than the spectrum of the first service provider and the second service provider; and
  a third modem coupled to the third downlink input port, the third modem configured to form a plurality of third downlink signal streams in an individual spectrum of the third service provider and distribute each of the plurality of third downlink signal streams to a respective downlink signal processing output port among a plurality of third downlink signal processing output ports;

the plurality of downlink combiner circuits each further comprising a third downlink combiner input port coupled to a downlink signal processing output port among the plurality of third downlink signal processing output ports;
  each downlink combiner circuit among the plurality of downlink combiner circuits configured to combine a downlink signal stream among the plurality of third downlink signal streams on the third downlink combiner input port with the downlink signal stream of the plurality of first downlink signal streams on the first downlink combiner input port and the downlink signal stream of the plurality of second downlink signal streams on the second downlink combiner input port, to generate the combined downlink signal stream on the downlink combiner output port.

3. The radio node of claim 1, wherein:
the first modem is configured to form the plurality of first downlink signal streams as a plurality of first digital downlink signal streams;
the second modem is configured to form the plurality of second downlink signal streams as a plurality of second digital downlink signal streams; and
each downlink combiner circuit among the plurality of downlink combiner circuits is configured to combine a digital downlink signal stream of the plurality of first digital downlink signal streams on the first downlink combiner input port and a digital downlink signal stream of the plurality of second digital downlink signal streams on the second downlink combiner input port to generate the combined downlink signal stream comprising a combined digital downlink signal stream on the downlink combiner output port.

4. The radio node of claim 3, wherein:
the plurality of first digital downlink signal streams are each represented by an in-phase/quadrature (I/Q) signal of the modulated digital downlink signal stream; and
the plurality of second digital downlink signal streams are each represented by an I/Q signal of the modulated digital downlink signal stream.

5. The radio node of claim 3, wherein each downlink combiner circuit among the plurality of downlink combiner circuits comprises a downlink digital summation circuit configured to sum the digital downlink signal stream of the plurality of first digital downlink signal streams on the first downlink combiner input port and the digital downlink signal stream of the plurality of second digital downlink signal streams on the second downlink combiner input port to generate the combined digital downlink signal stream.

6. The radio node of claim 3, wherein:
each RF chain circuit among the plurality of RF chain circuits comprises a digital-to-analog (D/A) converter circuit and is configured to process the combined digital downlink signal stream into a processed combined digital downlink signal stream, by the D/A converter circuit being configured to convert the combined digital downlink signal stream into a combined RF downlink signal stream; and
each RF chain circuit among the plurality of RF chain circuits is configured to distribute the combined RF downlink signal stream to the coupled antenna element among the plurality of antenna elements in the antenna array.

7. The radio node of claim 1, wherein:
each RF chain circuit among the plurality of RF chain circuits comprises a power amplifier circuit configured to amplify the combined RF downlink signal stream into an amplified combined RF downlink signal stream; and
each RF chain circuit among the plurality of RF chain circuits is configured to distribute the amplified combined RF downlink signal stream to the coupled antenna element among the plurality of antenna elements in the antenna array.

8. The radio node of claim 1, wherein:
each RF chain circuit among the plurality of RF chain circuits comprises a frequency up-converter circuit configured to up-convert a frequency of the combined RF downlink signal stream into an up-converted combined RF downlink signal stream; and
each RF chain circuit among the plurality of RF chain circuits is configured to distribute the up-converted combined RF downlink signal stream to the coupled antenna element among the plurality of antenna elements in the antenna array.

9. The radio node of claim 1, wherein:
each RF chain circuit among the plurality of RF chain circuits is further configured to receive a respective combined uplink signal stream on an uplink input port coupled to the antenna element among the plurality of antenna elements in the antenna array, process the combined uplink signal stream into a processed combined uplink signal stream, and distribute the processed combined uplink signal stream to an uplink splitter input port of an uplink splitter circuit among a plurality of uplink splitter circuits;
each uplink splitter circuit among the plurality of uplink splitter circuits further comprising a first uplink splitter output port coupled to a first uplink signal processing input port among a plurality of first uplink signal processing input ports of the first signal processing circuit, and a second uplink splitter output port coupled to a second uplink signal processing input port among a plurality of second uplink signal processing input ports of the second signal processing circuit;
each uplink splitter circuit among the plurality of uplink splitter circuits is configured to split the combined uplink signal stream on the uplink splitter input port to a first uplink signal stream among a plurality of first uplink signal streams on the first uplink splitter output port and a second uplink signal stream among a plurality of second uplink signal streams on the second uplink splitter output port;
the first signal processing circuit further comprises:
a first uplink signal processing output port configured to be coupled to the first signal source;
the first uplink signal processing input port coupled to the first uplink splitter output port;
the second uplink signal processing input port coupled to the second uplink splitter output port; and
the first modem coupled to the first uplink signal processing input port and the second uplink signal processing input port, the first modem configured to form a first uplink communications signal comprising the first uplink signal stream and the second uplink signal stream in the individual spectrum of the first service provider and distribute the first uplink communications signal to the first uplink signal processing output port;
the second signal processing circuit further comprises:
a second uplink signal processing output port configured to be coupled to the second signal source;
a third uplink signal processing input port coupled to the first uplink splitter output port; and
a fourth uplink signal processing input port coupled to the second uplink splitter output port;
the second modem coupled to the first uplink signal processing input port and the second uplink signal processing input port, the second modem configured to form a second uplink communications signal comprising the first uplink signal stream and the second uplink signal stream in the individual spectrum of the second service provider and distribute the second uplink communications signal to the second uplink signal processing output port.

10. The radio node of claim 9, further comprising:
a third signal processing circuit comprising a plurality of third uplink signal processing input ports;
each uplink splitter circuit among the plurality of uplink splitter circuits further comprising a third uplink splitter output port coupled to a third uplink signal processing input port among the plurality of third uplink signal processing input ports;
each uplink splitter circuit among the plurality of uplink splitter circuits further configured to split the combined uplink signal stream on the uplink splitter input port to further comprise a third uplink signal stream among a plurality of third uplink signal streams on the third uplink splitter output port;
the third signal processing circuit further comprises:
a third uplink signal processing output port configured to be coupled to a third signal source;
the first uplink signal processing input port coupled to the first uplink splitter output port;
the second uplink signal processing input port coupled to the second uplink splitter output port;
the third uplink signal processing input port coupled to the third uplink splitter output port; and
a third modem coupled to the first uplink signal processing input port, the second uplink signal processing input port, and the third uplink signal processing input port, the third modem configured to form a third uplink communications signal comprising the first uplink signal stream, the second uplink signal stream, and the third uplink signal stream in an individual spectrum of a third service provider and distribute the third uplink communications signal to the third uplink signal processing output port.

11. The radio node of claim 9, wherein:
the first modem is configured to form the first uplink communications signal as a first digital uplink communications signal, and distribute the first digital uplink communications signal to the first uplink signal processing output port; and
the second modem is configured to form the second uplink communications signal as a second digital uplink communications signal, and distribute the second digital uplink communications signal to the second uplink signal processing output port.

12. The radio node of claim 11, wherein:
the first digital uplink communications signal is represented by a first in-phase/quadrature (I/Q) signal of the modulated uplink communications signal; and the second digital uplink communications signal is represented by a second I/Q signal of the modulated uplink communications signal.

13. The radio node of claim 11, wherein each uplink splitter circuit among the plurality of uplink splitter circuits comprises an uplink digital splitter circuit configured to split the combined uplink signal stream on the uplink splitter input port to a first digital uplink signal stream on the first uplink splitter output port and a second uplink signal stream on the second uplink splitter output port.

14. The radio node of claim 11, wherein:
each RF chain circuit among the plurality of RF chain circuits further comprises an analog-to-digital (A/D) converter circuit and is configured to process the combined uplink signal stream on the uplink input port into a processed combined digital uplink signal stream, by the A/D converter circuit being configured to convert the combined uplink signal stream into a combined digital uplink signal stream; and
each RF chain circuit among the plurality of RF chain circuits is configured to distribute the combined digital uplink signal stream to the uplink splitter input port of the uplink splitter circuit among the plurality of uplink splitter circuits.

15. The radio node of claim 9, wherein:
each RF chain circuit among the plurality of RF chain circuits comprises a low-noise amplifier (LNA) circuit configured to amplify the received respective combined uplink signal stream on the uplink input port coupled to the antenna element among the plurality of antenna elements in the antenna array into an amplified combined uplink signal stream; and
each RF chain circuit among the plurality of RF chain circuits is configured to distribute the amplified combined uplink signal stream to the uplink splitter input port of the uplink splitter circuit among the plurality of uplink splitter circuits.

16. The radio node of claim 9, wherein:
each RF chain circuit among the plurality of RF chain circuits comprises a frequency down-converter circuit configured to down-convert a frequency of the received combined uplink signal stream on the uplink input port into a down-converted combined uplink signal stream;
each RF chain circuit among the plurality of RF chain circuits is configured to process the down-converted combined uplink signal stream into a processed down-converted combined uplink signal stream, and distribute the processed down-converted combined uplink signal stream to the uplink splitter input port of the uplink splitter circuit among the plurality of uplink splitter circuits.

17. The radio node of claim 1, wherein each the plurality of RF chain circuits further comprise an analog phase shifter circuit comprising a plurality of analog phase shifters, each analog phase shifter among the plurality of analog phase shifters configured to phase shift the processed combined RF downlink signal to a phase shifted processed combined RF downlink signal stream and distribute the phase shifted processed combined RF downlink signal stream to an antenna element.

18. The radio node of claim 17, each analog phase shifter among the plurality of analog phase shifters in each RF chain circuit among the plurality of RF chain circuits is configured to distribute the phase shifted processed combined RF downlink signal stream to an antenna element in an antenna sub-array of antenna elements among a plurality of antenna sub-arrays in the antenna array.

19. The radio node of claim 18, further comprising an analog phase shifting determination circuit configured to generate a phase shift control signal to the plurality of analog phase shifter circuits in each antenna sub-array of the plurality of antenna sub-arrays to cause the plurality of analog phase shifters in each of the plurality of analog phase shifter circuits to phase shift the processed combined RF downlink signal stream to a respective phase.

20. The radio node of claim 18, further comprising a precoding calculation circuit configured to calculate analog and digital precoding weights for the first and second signal processing circuits to generate a phase shift control signal to the plurality of analog phase shifter circuits in each antenna sub-array of the plurality of antenna sub-arrays, to cause a plurality of analog phase shifters in each of the plurality of analog phase shifter circuits to phase shift the processed combined RF downlink signal stream to a respective phase.

21. The radio node of claim 1, further comprising a plurality of analog phase shifter circuits each comprising a plurality of analog phase shifters each coupled to an antenna element among the plurality of antenna elements in the antenna array, each analog phase shifter circuit among the plurality of analog phase shifter circuits configured to phase shift the processed combined RF downlink signal stream;
wherein each RF chain circuit among the plurality of RF chain circuits is configured to distribute the processed combined RF downlink signal stream to an analog phase shifter in each analog phase shifter circuit among the plurality of analog phase shifter circuits.

22. The radio node of claim 21, further comprising an analog phase shifting determination circuit configured to generate a phase shift control signal coupled to the plurality of analog phase shifter circuits to cause the plurality of analog phase shifter circuits to phase shift the processed combined RF downlink signal stream to a respective phase.

23. The radio node of claim 21, further comprising a precoding calculation circuit configured to calculate analog and digital precoding weights for the first and second signal processing circuits to generate a phase shift control signal coupled to the plurality of analog phase shifter circuits to cause the plurality of analog phase shifter circuits to phase shift the processed combined RF downlink signal stream to a respective phase.

24. A method of distributing communications signals in a communications system to wireless client devices, comprising:
receiving a first downlink communications signal from a first signal source associated with a first service provider;
forming a plurality of first downlink signal streams in an individual spectrum of the first service provider based on the first downlink communications signal;
receiving a second downlink communications signal from a second signal source associated with a second service provider having a spectrum different than the spectrum of the first service provider;
forming a plurality of second downlink signal streams in an individual spectrum of the second service provider based on the second downlink communications signal;
combining a downlink signal stream among the plurality of first downlink signal streams with a downlink signal stream among the plurality of second downlink signal streams to generate a combined downlink signal stream;
processing the combined downlink signal stream into a combined radio-frequency (RF) downlink signal stream;

distributing the combined RF downlink signal stream to a coupled antenna element among a plurality of antenna elements in an antenna array;

receiving a respective combined uplink signal stream on an uplink input port coupled to the antenna element among a plurality of antenna elements in the antenna array;

splitting the combined uplink signal stream to a first uplink signal stream among a plurality of first uplink signal streams and a second uplink signal stream among a plurality of second uplink signal streams;

forming a first uplink communications signal comprising the first uplink signal stream and the second uplink signal stream in the individual spectrum of the first service provider;

distributing the first uplink communications signal to the first service provider;

forming a second uplink communications signal comprising the first uplink signal stream and the second uplink signal stream in the individual spectrum of the second service provider; and distributing the second uplink communications signal to the second service provider.

25. The method of claim 24, further comprising:

receiving a third downlink communications signal from a third signal source associated with a third service provider having a spectrum different than the spectrum of the first service provider and the second service provider; and forming a plurality of third downlink signal streams in an individual spectrum of the third service provider based on the third downlink communications signal; and combining a downlink signal stream among the plurality of third downlink signal streams with the downlink signal stream of the plurality of first downlink signal streams and the downlink signal stream of the plurality of second downlink signal streams, to generate the combined downlink signal stream.

26. The method of claim 24, further comprising:

splitting the combined uplink signal stream to further comprise a third uplink signal stream among a plurality of third uplink signal streams;

forming a third uplink communications signal comprising the first uplink signal stream, the second uplink signal stream, and the third uplink signal stream in an individual spectrum of a third service provider; and distributing the third uplink communications signal to the third service provider.

27. A radio node for distributing communications signals in a communications system configured to:

receive a first downlink communications signal from a first signal source associated with a first service provider;

form a plurality of first downlink signal streams in an individual spectrum of the first service provider based on the first downlink communications signal;

receive a second downlink communications signal from a second signal source associated with a second service provider having a spectrum outside of the first service provider;

form a plurality of second downlink signal streams in an individual spectrum of the second service provider based on the second downlink communications signal;

combine a downlink signal stream among the plurality of first downlink signal streams with a downlink signal stream among the plurality of second downlink signal streams to generate a combined downlink signal stream;

process the combined downlink signal stream into a combined radio-frequency (RF) downlink signal stream;

distribute the combined RF downlink signal stream to a coupled antenna element among a plurality of antenna elements in an antenna array;

receive a respective combined uplink signal stream on an uplink input port coupled to the antenna element among the plurality of antenna elements in the antenna array;

split the combined uplink signal stream to a first uplink signal stream among a plurality of first uplink signal streams and a second uplink signal stream among a plurality of second uplink signal streams;

form a first uplink communications signal comprising the first uplink signal stream and the second uplink signal stream in the individual spectrum of the first service provider;

distribute the first uplink communications signal to the first service provider;

form a second uplink communications signal comprising the first uplink signal stream and the second uplink signal stream in the individual spectrum of the second service provider; and distribute the second uplink communications signal to the second service provider.

28. The radio node of claim 27, further configured to:

receive a third downlink communications signal from a third signal source associated with a third service provider having a spectrum different than the spectrum of the first service provider and the second service provider;

form a plurality of third downlink signal streams in an individual spectrum of the third service provider based on the third downlink communications signal; and combine a downlink signal stream among the plurality of third downlink signal streams with the downlink signal stream among the plurality of first downlink signal streams and the downlink signal stream of the plurality of second downlink signal streams, to generate the combined downlink signal stream.

29. The radio node of claim 27, further configured to:

split the combined uplink signal stream to further comprise a third uplink signal stream among a plurality of third uplink signal streams;

form a third uplink communications signal comprising the first uplink signal stream, the second uplink signal stream, and the third uplink signal stream in an individual spectrum of a third service provider; and distribute the third uplink communications signal to the third service provider.

* * * * *

UNITED STATES PATENT AND TRADEMARK OFFICE
CERTIFICATE OF CORRECTION

PATENT NO. : 10,693,528 B1  
APPLICATION NO. : 16/442223  
DATED : June 23, 2020  
INVENTOR(S) : Igor Berlin et al.

Page 1 of 1

It is certified that error appears in the above-identified patent and that said Letters Patent is hereby corrected as shown below:

On the Title Page

In Column 1, item (63), Assignee, Line 1, delete "Reaserch" and insert -- Research --, therefor.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*